(12) United States Patent
Potnis et al.

(10) Patent No.: US 11,307,429 B2
(45) Date of Patent: Apr. 19, 2022

(54) SINGLE RGB COMBINER WITH LARGE FIELD OF VIEW

(71) Applicant: North Inc., Kitchener (CA)

(72) Inventors: Shreyas Potnis, Kitchener (CA); Timothy Paul Bodiya, Toronto (CA)

(73) Assignee: Google LLC, Mountain View, CA (US)

( * ) Notice: Subject to any disclaimer, the term of this patent is extended or adjusted under 35 U.S.C. 154(b) by 102 days.

(21) Appl. No.: 16/738,100

(22) Filed: Jan. 9, 2020

(65) Prior Publication Data
US 2020/0225498 A1    Jul. 16, 2020

Related U.S. Application Data

(60) Provisional application No. 62/846,979, filed on May 13, 2019, provisional application No. 62/791,514, filed on Jan. 11, 2019.

(51) Int. Cl.
*G02B 27/10*    (2006.01)
*G03H 1/02*    (2006.01)
*G02B 5/32*    (2006.01)

(52) U.S. Cl.
CPC .......... *G02B 27/1006* (2013.01); *G02B 5/32* (2013.01); *G02B 27/1086* (2013.01); *G03H 1/0248* (2013.01)

(58) Field of Classification Search
CPC .. G02B 27/1006; G02B 27/1086; G02B 5/32; G02B 5/1866; G02B 27/4272; G02B 2027/0174; G02B 2027/0178; G02B 27/0172; G03H 1/0248; G03H 2001/303; G03H 2001/2226
See application file for complete search history.

(56) References Cited

U.S. PATENT DOCUMENTS 8,320,032 B2 * 11/2012 Levola ................. G02B 6/0035
359/34
9,250,373 B2 * 2/2016 Kubota ................ G02B 27/017

\* cited by examiner

*Primary Examiner* — Jade R Chwasz

(57) ABSTRACT

An optical combiner includes an optical substrate. An in-coupler grating is positioned to receive an incident light with a FOV and couple a first portion of the incident light into a first propagation path within the optical substrate and a second portion of the incident light into a second propagation path within the optical substrate. The first light portion includes light of a first color, while the second light portion excludes light of the first color. The optical combiner includes fold gratings to expand the first light portion and second light portion and direct the expanded light towards an out-coupler grating, which couples the expanded light out of the optical substrate at multiple exit pupils.

20 Claims, 14 Drawing Sheets

SINGLE RGB COMBINER WITH LARGE FIELD OF VIEW

CROSS-REFERENCE TO RELATED APPLICATIONS

This application claims the benefit of U.S. Provisional Application No. 62/846,979, filed 13 May 2019, titled "Single RGB Combiner with Large Field of View" and U.S. Provisional Application No. 62/791,514, filed 11 Jan. 2019, titled "Systems, Devices, and Methods for Light Guide Based Wearable Heads-Up Displays", the content of which is incorporated herein in its entirety by reference.

BACKGROUND

Wearable heads-up displays use optical combiners to combine real world and virtual images. There are two main classes of optical combiners used in wearable heads-up displays: free-space combiners and substrate-guided combiners. Free-space combiners use one or more reflective, refractive, or diffractive optical elements to redirect light from a light source to an eye. Substrate-guided combiners are typically waveguide or lightguide combiners. Light enters a guide substrate, e.g., a lightguide or waveguide, typically through an in-coupling element, propagates along the length of the guide substrate by total internal reflection (TIR), and exits the guide substrate through an out-coupling element. There may be additional optical elements to redirect light, e.g., reflect, refract, or diffract light, within the guide substrate.

The field of view (FOV) supported by a substrate-guided combiner depends primarily on the index of the guide substrate and the geometry of the guide substrate. When a substrate-guided combiner is integrated with a lens, such as an eyeglass lens, the FOV of the combiner is further constrained by the physical space on the lens, leading to a conflict between making the combiner big enough to achieve a large FOV and small enough to fit within the physical space on the lens.

SUMMARY

An optical combiner may be summarized as including an optical substrate having characteristics to guide light by total internal reflection; an in-coupler grating positioned to receive an incident light with a FOV, the in-coupler grating tuned to couple a first portion of the incident light with a first part of the FOV (first light portion) into a first propagation path within the optical substrate and a second portion of the incident light with a second part of the FOV (second light portion) into a second propagation path within the optical substrate, the first light portion including light of a first color, the second light portion excluding light of the first color; a first fold grating in optical communication with the first propagation path, the first fold grating tuned to generate a plurality of first sub-beams from the first light portion and change a beam propagation direction of the first sub-beams from the propagation direction of the first light portion, a second fold grating in optical communication with the second propagation path, the second fold grating tuned to generate a plurality of second sub-beams from the second light portion and change a beam propagation direction of the second sub-beams from the propagation direction of the second light portion; and an out-coupler grating positioned to receive the first sub-beams from the first fold grating and the second sub-beams from the second fold grating, the out-coupler grating having one or more diffraction gratings tuned to couple the first sub-beams and the second sub-beams out of the optical substrate at a plurality of exit pupils.

Another optical combiner lens may be summarized as including a lens; an optical substrate in stack with the lens; an in-coupler grating positioned to receive an incident light with a FOV, the in-coupler grating tuned to couple a first portion of the incident light with a first part of the FOV (first light portion) into a first propagation path within the optical substrate and a second portion of the incident light with a second part of the FOV (second light portion) into a second propagation path within the optical substrate, the first light portion including light of a first color, the second light portion excluding light of the first color; a first fold grating in optical communication with the first propagation path, the first fold grating tuned to generate a plurality of first sub-beams from the first light portion and change a beam propagation direction of the first sub-beams from the propagation direction of the first light portion; a second fold grating in optical communication with the second propagation path, the second fold grating tuned to generate a plurality of second sub-beams from the second light portion and change a beam propagation direction of the second sub-beams from the propagation direction of the second light portion; and an out-coupler grating positioned to receive the first sub-beams from the first fold grating and the second sub-beams from the second fold grating, the out-coupler grating having one or more diffraction gratings tuned to couple the first sub-beams and the second sub-beams out of the optical substrate at a plurality of exit pupils.

Yet another optical combiner lens may be summarized as including a first lens; a second lens; an optical substrate in stack with and in between the first lens and the second lens; an in-coupler grating positioned to receive an incident light with a FOV, the in-coupler grating tuned to couple a first portion of the incident light with a first part of the FOV (first light portion) into a first propagation path within the optical substrate and a second portion of the incident light with a second part of the FOV (second light portion) into a second propagation path within the optical substrate, the first light portion including light of a first color, the second light portion excluding light of the first color; a first fold grating in optical communication with the first propagation path, the first fold grating tuned to generate a plurality of first sub-beams from the first light portion and change a beam propagation direction of the first sub-beams from the propagation direction of the first light portion; a second fold grating in optical communication with the second propagation path, the second fold grating tuned to generate a plurality of second sub-beams from the second light portion and change a beam propagation direction of the second sub-beams from the propagation direction of the second light portion; and an out-coupler grating positioned to receive the first sub-beams from the first fold grating and the second sub-beams from the second fold grating, the out-coupler grating having one or more diffraction gratings tuned to couple the first sub-beams and the second sub-beams out of the optical substrate at a plurality of exit pupils.

A method of projecting an image to an eye may be summarized as including receiving light with a FOV at an in-coupler grating; coupling a first portion of the light having a first part of the FOV (first light portion) into a first propagation path within an optical substrate by the in-coupler grating, the first light portion including light of a first color; coupling a second portion of the light having a second part of the FOV (second light portion) into a second propagation path within the optical substrate by the in-coupler grating, the second light portion excluding light of the first color; expanding the first light portion to generate a plurality of first sub-beams and redirecting the first sub-beams towards an out-coupler grating; expanding the second light portion to generate a plurality of second sub-beams and redirecting the second sub-beams towards the out-coupler grating; and receiving the first sub-beams and the second sub-beams at the out-coupler grating and redirecting the first sub-beams and the second sub-beams out of the optical substrate at a plurality of exit pupils.

The foregoing general description and the following detailed description are exemplary of the invention and are intended to provide an overview or framework for understanding the nature of the invention as it is claimed. The accompanying drawings are included to provide further understanding of the invention and are incorporated in and constitute part of this specification. The drawings illustrate various embodiments of the invention and together with the description serve to explain the principles and operation of the invention.

BRIEF DESCRIPTION OF DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements and have been solely selected for ease of recognition in the drawing.

FIG. 8A-2 is a schematic diagram of a spatial- and wavelength-multiplexed holographic grating having a holographic region that responds to light of a second color and another holographic region that responds to light of a third color for a given range of incidence angles.

FIG. 8A-3 is a schematic diagram of a spatial- and wavelength-multiplexed holographic grating having a holographic region that responds to light of a second color and another holographic region that responds to light of a third color for another given range of incidence angles.

FIG. 8A-4 is a schematic diagram of an in-coupler grating formed with the holograms of FIGS. 8A-1, 8A-2, and 8A-3.

FIG. 8A-5 is a schematic diagram of an alternative in-coupler grating formed with a stack of five holograms.

DETAILED DESCRIPTION

Figure 1A:
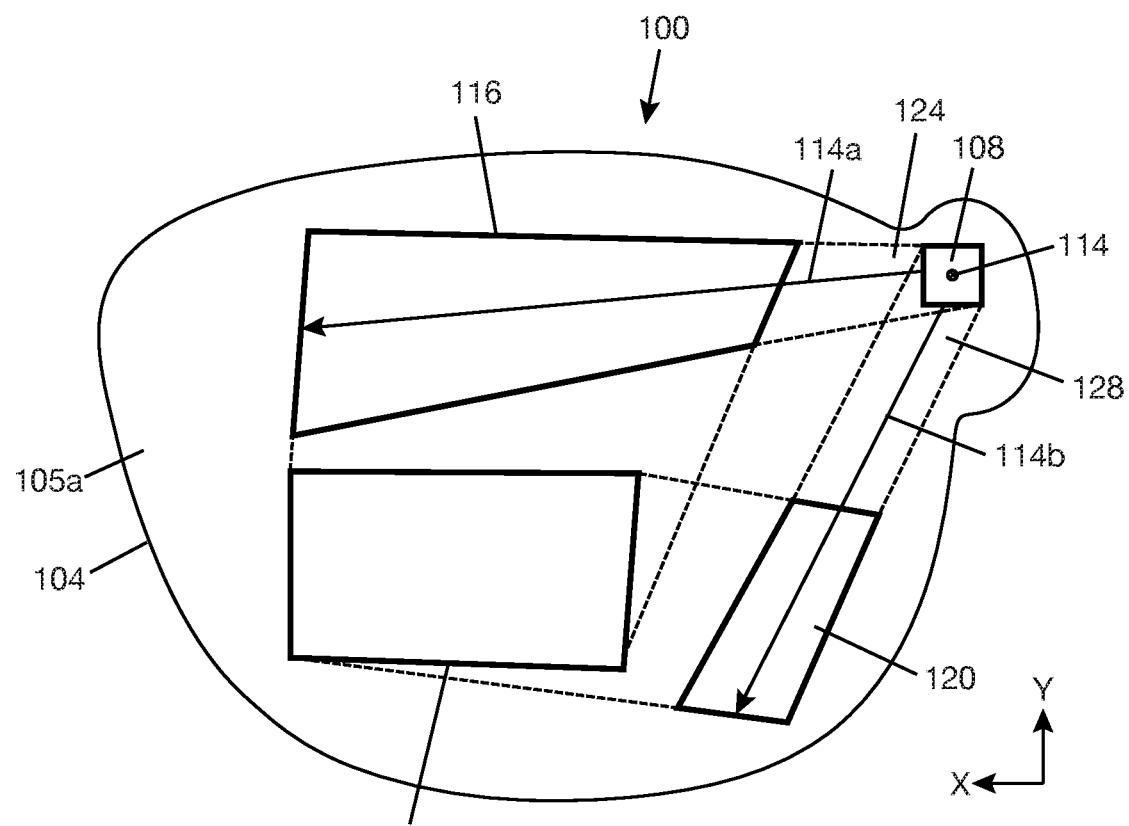
FIG. 1A is a front view of an optical combiner.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices have not been shown or described in detail to avoid unnecessarily obscuring descriptions of the embodiments. For the sake of continuity, and in the interest of conciseness, same or similar reference characters may be used for same or similar objects in multiple figures. For the sake of brevity, the term "corresponding to" may be used to describe correspondence between features of different figures. When a feature in a first figure is described as corresponding to a feature in a second figure, the feature in the first figure is deemed to have the characteristics of the feature in the second figure, and vice versa, unless stated otherwise.

In this disclosure, unless the context requires otherwise, throughout the specification and claims which follow, the word "comprise" and variations thereof, such as, "comprises" and "comprising" are to be construed in an open, inclusive sense, that is as "including, but not limited to."

In this disclosure, reference to "one implementation" or "an implementation" or to "one embodiment" or "an embodiment" means that a particular feature, structures, or characteristics may be combined in any suitable manner in one or more implementations or one or more embodiments.

In this disclosure, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the disclosure provided herein are for convenience only and do not interpret the scope or meaning of the embodiments.

Figure 1B:
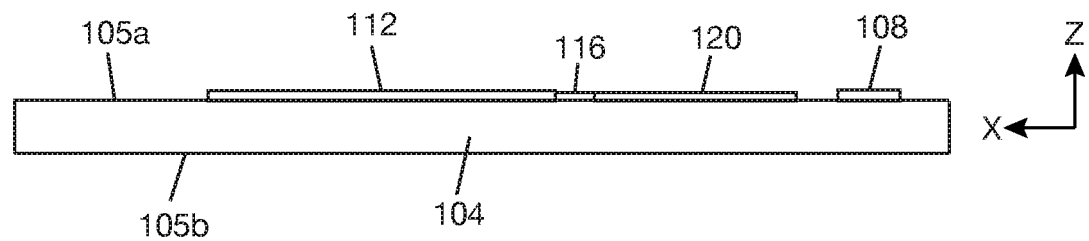
FIG. 1B is a side view of the optical combiner of FIG. 1A.

FIGS. 1A and 1B show an optical combiner 100 including an optical substrate 104, an in-coupler grating 108, an out-coupler grating 112, and fold gratings 116, 120. In-coupler grating 108, out-coupler grating 112, and fold gratings 116, 120 are diffraction gratings, or more generally diffractive optical elements (DOEs). Optical substrate 104 may be a lightguide or waveguide that transfers collimated light by TIR. Light is coupled into optical substrate 104 by in-coupler grating 108 and coupled out of optical substrate 104 by out-coupler grating 112. Optical substrate 104 has major surfaces 105a, 105b that are spaced apart along an axial thickness of optical substrate 104, i.e., along the Z axis (in FIG. 1B). In the example shown in FIGS. 1A and 1B, in-coupler grating 108, out-coupler grating 112, and fold gratings 116, 120 are positioned on major surface 105a. Alternatively, in-coupler grating 108, out-coupler grating 112, and fold gratings 116, 120 could be embedded in a portion of optical substrate 104 proximate major surface 105a. Alternatively, any of in-coupler grating 108, out-coupler grating 112, and fold gratings 116, 120 could be positioned on or embedded in a portion of optical substrate 104 proximate major surface 105b. In general, which major surface the gratings are positioned on or proximate to will depend on whether the gratings are transmission gratings or reflection gratings. In some cases, any of the in-coupler grating 108, out-coupler grating 112, and fold gratings 116, 120 could be split between the different sides of optical substrate 104, e.g., with one part of the grating on or proximate major surface 105a and the remaining part of the grating on or proximate major surface 105b.

In FIG. 1A, optical substrate 104 has an eyeglass lens shape with a tab to carry in-coupler grating 108. However, optical substrate 104 is not limited to the shape shown in FIG. 1A and may have any suitable shape, including a shape without a tab. Optical substrate 104 may be a planar substrate, meaning that each of major surfaces 105a, 105b is a planar surface. Alternatively, optical substrate 104 may be a curved substrate, meaning that at least one of major surfaces 105a, 105b is a curved surface (e.g., does not lie in a flat plane). Complex major surfaces that include planar surface portions formed contiguously with curved surface portions, or planar surface portions formed contiguously with other out-of-plane planar surface portions, are also possible. Optical substrate 104 with complex major surfaces may be described as a splined substrate. Optical substrate 104 is transparent to at least some wavelengths of electromagnetic energy, e.g., wavelengths in the visible range and optionally wavelengths in the infrared range. Optical substrate 104 may be made of plastic, e.g., polycarbonate material, or glass, or other material capable of transferring light by TIR. Optical substrate 104 is typically made of a high index material (e.g., refractive index >1.45) such that the refractive index of optical substrate 104 is higher than the refractive index of a surrounding medium, a condition that is needed for TIR within the substrate. One or more coatings, such as anti-scratch coating, anti-reflective coating, and/or IR-blocking coating, may be selectively applied to major surfaces 105a, 105b and other surfaces of optical substrate 104.

In-coupler grating 108 includes one or more diffraction gratings designed to split an incident light 114 with a FOV into a first light portion 114a having a first part of the FOV and a second light portion 114b having a second part of the FOV. Incident light 114 may be a polychromatic light having light of at least two different colors, more typically light of three colors. The split of the FOV may be based on color, i.e., there is at least one color difference between first light portion 114a and second light portion 114b, and may be further based on angles. In one implementation, first light portion 114a includes light of a first color C1, and second light portion 114b having the second part of the FOV excludes light of the first color C1. First light portion 114a having the first part of the FOV may include light of one or more other colors besides the first color C1. Second light portion 114b having the second part of the FOV includes light of at least one other color that is not the first color, e.g., light of a second color C2 and/or light of a third color C3.

In-coupler grating 108 couples first light portion 114a into a first propagation path 124 within optical substrate 104 and couples second light portion 114b into a second propagation path 128 within optical substrate 104, where first propagation path 124 and second propagation path 128 are oriented in different directions within optical substrate 104. The orientations and locations of the first propagation path 124 and second propagation path 128 within lightguide 104 are design elements based on optical substrate geometry and optical path modeling considerations and are not limited to what is shown in FIG. 1A. For example, in FIG. 1A, first propagation path 124 is oriented generally in a horizontal direction, and second propagation path 128 is oriented generally in a downward direction (horizontal and downward directions are relative to the orientation of the drawing). This could be swapped such that first propagation path 124 is oriented generally in the downward direction and second propagation path 128 is oriented generally in the horizontal direction.

In-coupler grating 108 may receive incident light 114 from a display light source. Examples of display light sources include, but are not limited to, scanning light projector, e.g., scanning laser projector, organic light-emitting diode (OLED) micro-display, liquid crystal on silicon (LCOS) micro-display, and digital light processing (DLP) display. For implementations where display light source is a scanning laser projector (or scanning light projector), display light source will generate multiple beams, each beam corresponding to a scan position of at least one scan mirror of the scanning laser projector. Each beam will be an incident light that is receivable by in-coupler grating 108. For a color display, incident light 114 would normally include red light, i.e., light having a wavelength between approximately 700 nm and 635 nm, green light, i.e., light having a wavelength between approximately 560 nm and 520 nm, and blue light, i.e., light having a wavelength between approximately 490 nm and 450 nm. For incident light 114 having red light, blue light, and green light, first color C1 included in the first light portion 114a coupled into first propagation path 124 may be a red color or a blue color. When first color C1 is a red color, the second light portion 114b excludes the red color. Similarly, when first color C1 is a blue color, the second light portion 114b excludes the blue color.

Table 1 shows two examples of splitting an incident light with a FOV into a first light portion that includes a first color C1 and a second light portion that excludes the first color C1. In the examples of Table 1, the incident light with the FOV includes red light, blue light, and green light. In Example 1, the first light portion with the first part of the FOV includes red light, some blue light, and some green light, and the second light portion with the second part of the FOV includes some blue light and some green light. In Example 2, the first light portion with the first part of the FOV includes blue light, and the second light portion with the second part of the FOV includes red light and green light.

TABLE 1

|  | First Color, C1 | Second Color, C2 | Third Color, C3 | FOV Part |
|---|---|---|---|---|
| Example 1 | Red | Blue | Green | First |
|  | — | Blue | Green | Second |
| Example 2 | Blue | — | — | First |
|  | — | Red | Green | Second |

Figure 2:
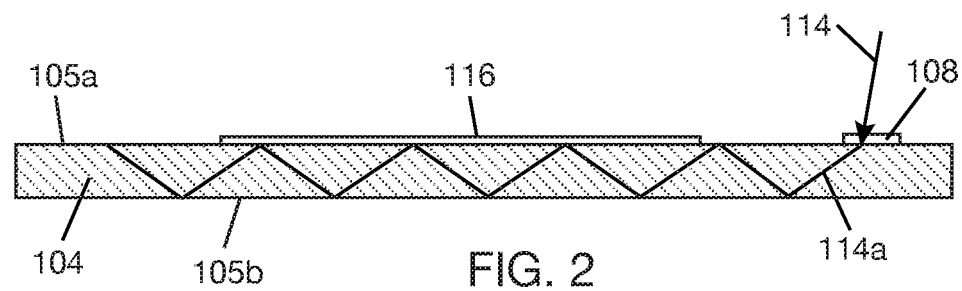
FIG. 2 is a schematic illustrating light propagating along a propagation path within an optical substrate of an optical combiner.
Figure 3:
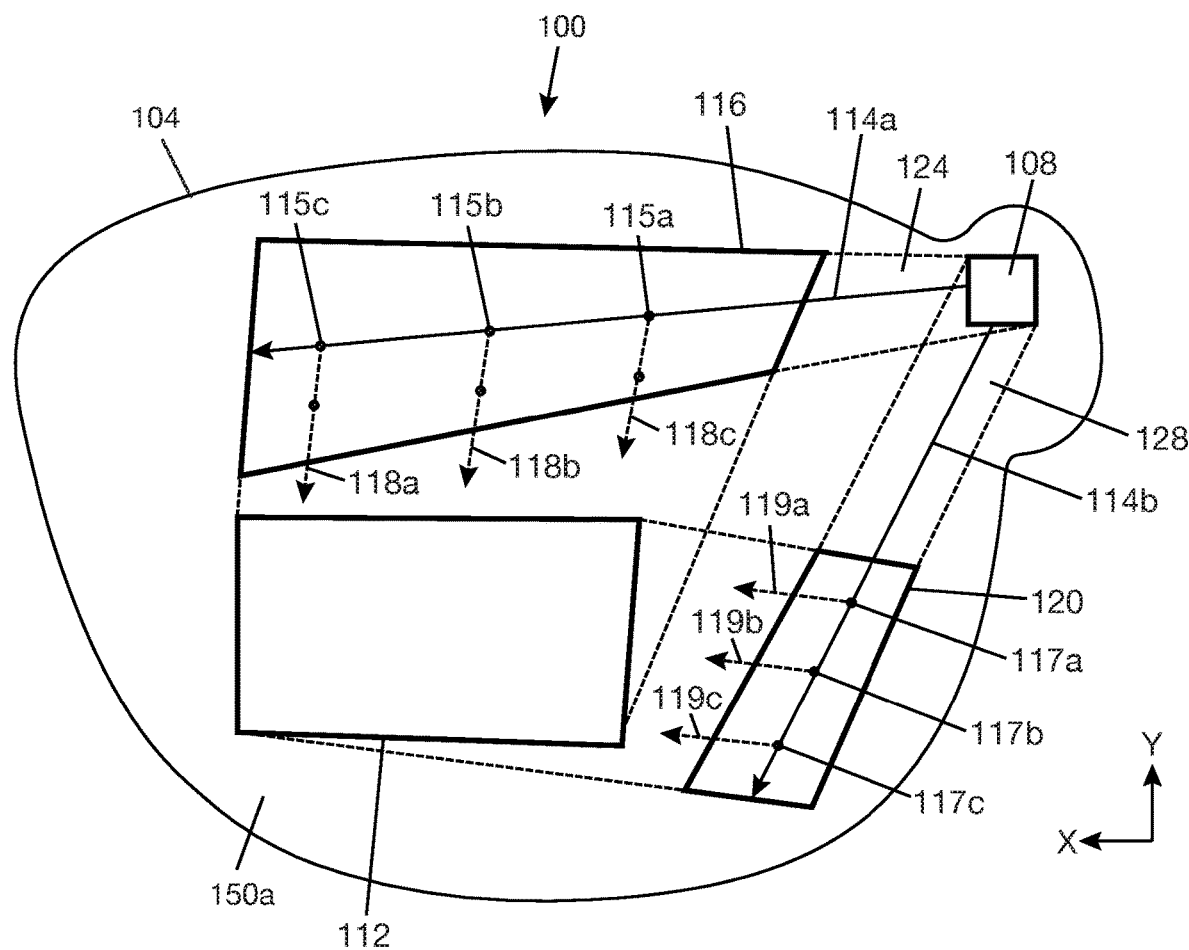
FIG. 3 is a front view of an optical combiner showing fold gratings expanding light and redirecting the expanded light towards an out-coupler grating.

Fold grating 116 is positioned at an intermediate stage between in-coupler grating 108 and out-coupler grating 112 and in line, or in optical communication, with first propagation path 124. Fold grating 116 is a diffractive grating that provides changes in beam propagation and beam expansion. The beam propagation and beam expansion function may be provided in a single grating layer. Fold grating 116 functions as an exit pupil expander. Fold grating 116 splits first light portion 114a into multiple sub-beams that are then directed towards out-coupler grating 112. In general, first light portion 114a propagating along first propagation path 124 by TIR will encounter fold grating 116 and bounce along fold grating 116, as shown by the propagating light 114a in FIG. 2 and the bounce points 115a, 115b, 115c in FIG. 3. The number of bounces along fold grating 116 are design elements that may depend on the desired number of exit pupils at out-coupler grating 112. In other words, the number of bounces is not limited to what is shown in FIGS. 2 and 3. With each bounce, a portion of the light will be diffracted in a direction towards out-coupler grating 112, as illustrated in FIG. 3 by sub-beams 118a, 118b, 118c. Each sub-beam may be an aggregate beam, depending on the composition of the first light portion 114a. For example, if first light portion 114a includes red light, some blue light, and some green light (Example 1 in Table 1), each sub-beam 118a, 118b, 118c will be an aggregate beam of red light, blue light, and green light.

Figure 4:
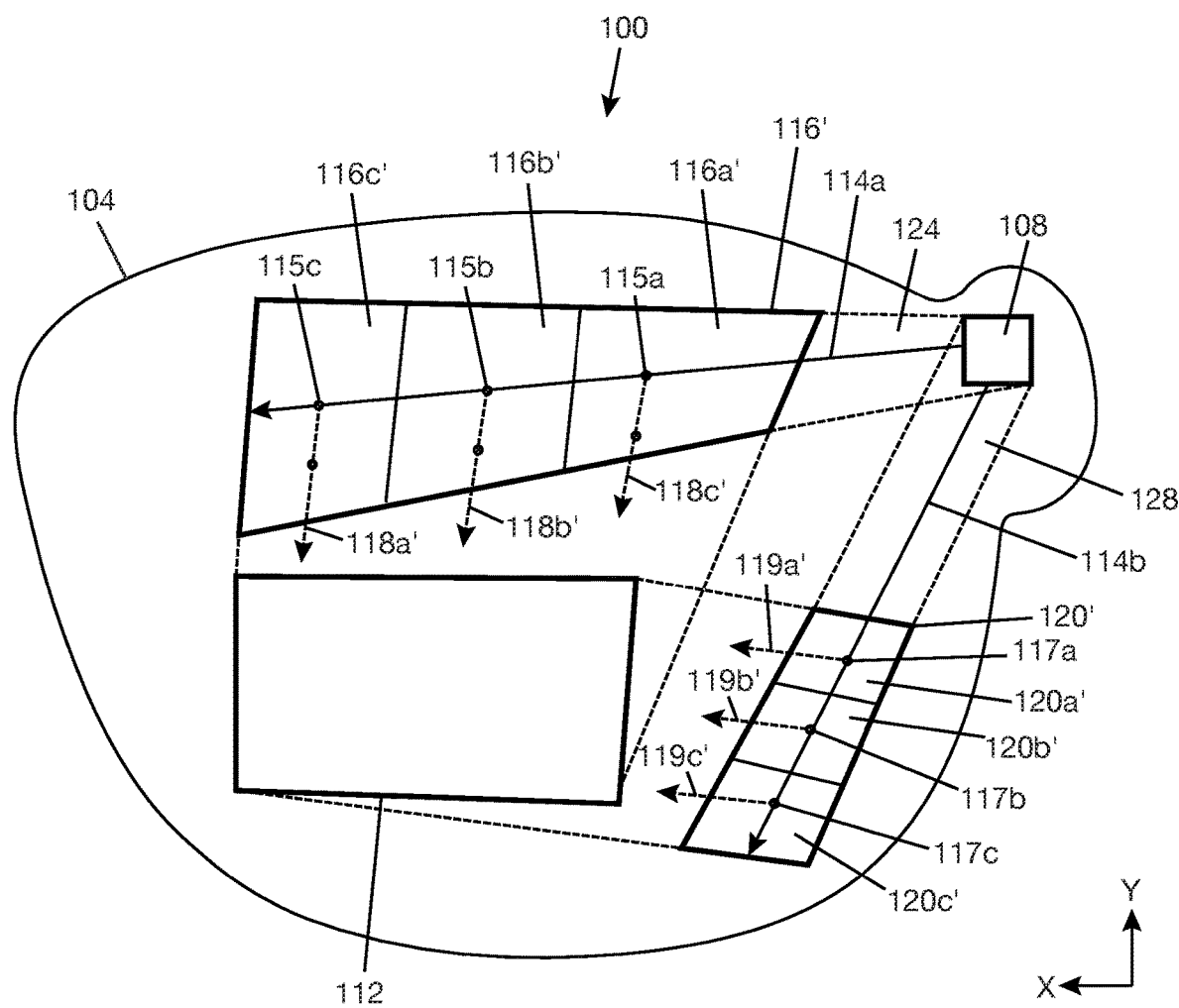
FIG. 4 is a front view of an optical combiner showing fold gratings with different diffractive regions.

In general, the intensity of first light portion 114a will lessen as first light portion 114a bounces along fold grating 116 and portions of first light portion 114a are diffracted towards out-coupler grating 112. That is, first light portion 114a will have a higher intensity at bounce point 115a than at bounce point 115b and a higher intensity at bounce point 115b than at bounce point 115c. What this means is that the sub-beams 118a, 118b, 118c will have different intensities if fold grating 116 does not compensate for the loss in intensity of the propagating first light portion 114a. (If each sub-beam is an aggregate beam, the intensity of each sub-beam will have intensity components corresponding to the number of light components in the aggregate beam.) In some cases, it may be desirable to minimize the variation in intensities of sub-beams 118a, 118b, 118c. One way of achieving this may be to provide fold grating 116 with different diffractive regions that have different diffractive efficiencies, which may be selected such that the variation in intensities of sub-beams 118a, 118b, 118c is minimal, i.e., does not exceed a set threshold—the set threshold may be based on a desired uniformity of the light out-coupled by out-coupler grating 112. FIG. 4 shows an example fold grating 116' with different diffractive regions 116a', 116b', 116c'. In general, first light portion 114a propagating along fold grating 116' will have a lower intensity when it encounters the last grating region 116c' compared to when it encounters the first grating region 116a'. Thus, the diffraction efficiencies of the grating regions can increase from the first grating region 116a' to the last grating region 116c' in order to produce sub-beams 118a', 118b', 118c' that have minimal variation in intensities.

Returning to FIG. 3, fold grating 120 is positioned at an intermediate stage between in-coupler grating 108 and out-coupler grating 112 and in line, or in optical communication, with second propagation path 128. Fold grating 120 is a diffractive grating that provides changes in beam propagation and beam expansion. The beam propagation and beam expansion function may be provided in a single grating layer. Fold grating 120 functions as an exit pupil expander. Fold grating 120 splits second light portion 114b into multiple beams that are then directed towards out-coupler grating 112. In general, second light portion 114b propagating along second propagation 128 by TIR will encounter fold grating 120 and bounce along fold grating 120, as shown by the bounce points 117a, 117b, 117c. The number of bounces shown is for illustrative purposes and not meant to limit the design of fold grating 120. With each bounce, a portion of the light will be diffracted in a direction towards out-coupler grating 112, as illustrated by sub-beams 119a, 119b, 119c. Each sub-beam may be an aggregate beam.

In the same manner described above for sub-beams 118a, 118b, 118c produced by fold grating 116, sub-beams 119a, 119b, 119c produced by fold grating 120 will have different intensities if fold grating 120 does not compensate for the loss in intensity of the propagating first light portion 114b. In some cases, it may be desirable to minimize the variation in intensities of sub-beams 119a, 119b, 119c. As described above for fold grating 116, fold grating 120 may be provided with different diffractive regions that have diffractive efficiencies, which can be selected such that the variation in intensities of sub-beams 119a, 119b, 119c is minimal, i.e., does not exceed a set threshold—the set threshold may be based on a desired uniformity of the light out-coupled by out-coupler grating 112. FIG. 4 shows an example fold grating 120' with different diffractive regions 120a', 120b', 120c'. In general, second light portion 114b propagating along fold grating 120' will have a lower intensity when it encounters the last grating region 120c' compared to when it encounters the first grating region 120a'. Thus, the diffraction efficiencies of the grating regions can be selected to increase from first grating region 120a' to last grating region 120c' in order to produce sub-beams 119a', 119b', 119c' that have minimal variation in intensities.

Figure 5:
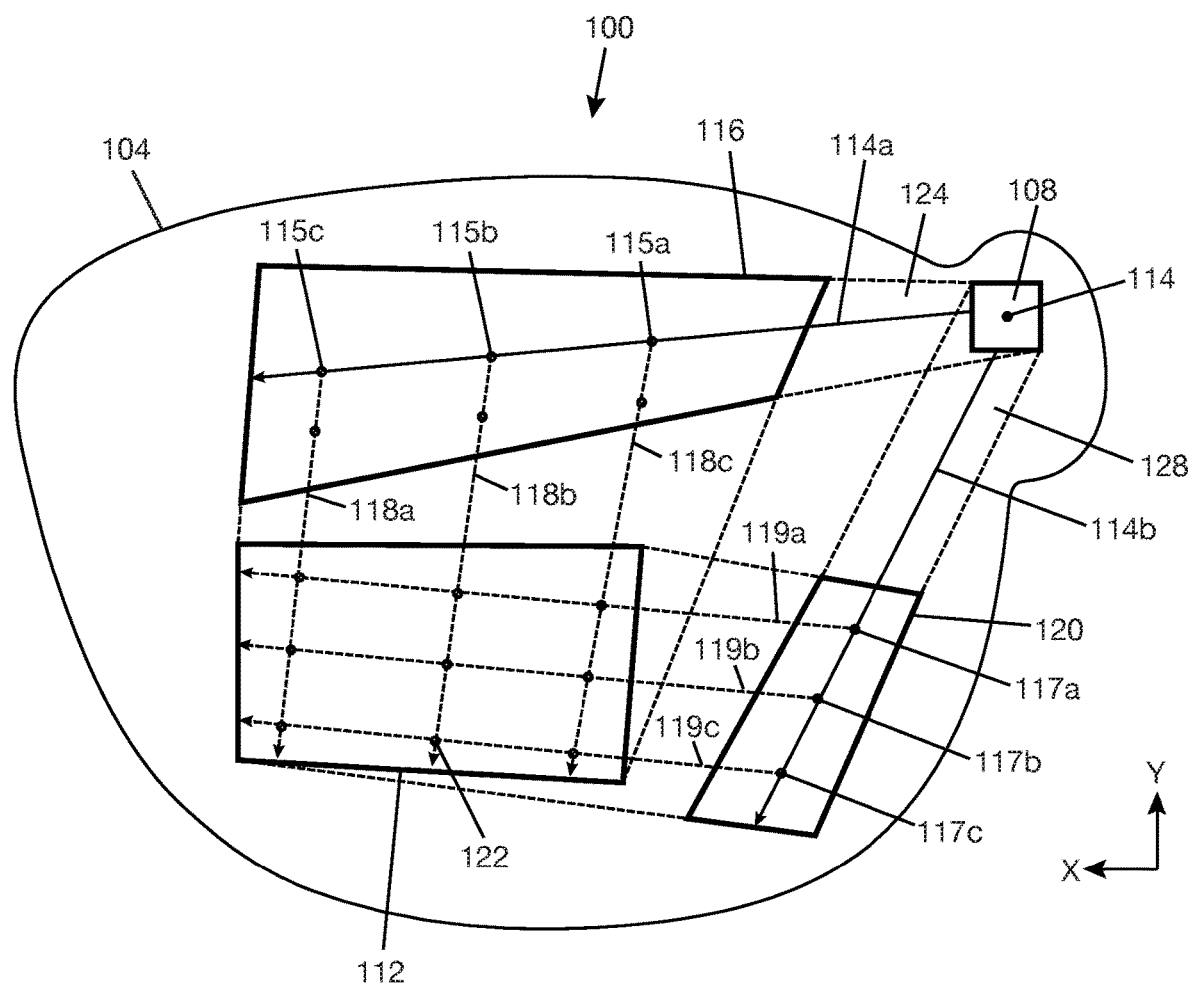
FIG. 5 is a front view of an optical combiner showing an out-coupler grating with multiple exit pupils.

FIG. 5 shows out-coupler grating 112 receiving sub-beams 118a, 118b, 118c (first sub-beams) diffracted by fold grating 116 and sub-beams 119a, 119b, 119c (second sub-beams) diffracted by fold grating 120. Each of the sub-beams will bounce across out-coupler grating 112, and a portion of the sub-beams will be coupled out of optical substrate 104 at each bounce. An array of exit pupils 122 is shown on out-coupler grating 112. Each exit pupil 122 represents where a first sub-beam crosses a second sub-beam and a portion of each of the first sub-beam and second sub-beam is coupled out. Since the light coupled out of each exit pupil 122 includes a portion of the first sub-beam and a portion of the second sub-beam, the light coupled out of optical substrate 104 at the respective exit pupil 122 has the same composition as the incident light 114 coupled into optical substrate 104. In other words, optical combiner 100 replicates the light received through in-coupler grating 108 to multiple exit pupils 122 at the out-coupler grating 112. The horizontal and vertical extents of the array of exit pupils 122 define the eyebox that is provided by optical combiner 100. For a heads-up display application, each exit pupil 122 will typically have a size that is smaller than a fully dilated size of an eye pupil, and the spacing between exit pupils 122 will typically be smaller than the fully dilated size of an eye pupil. This generally means that the eye pupil can receive light from one or more exit pupils 122 at a time, depending on the position of the eye in the eyebox.

In an out-coupler grating 112 that does not have intensity correction, the intensities of light coupled out of the multiple exit pupils 122 will vary across the array of exit pupils 122. For example, as sub-beam 119a bounces across out-coupler grating 112, the intensity of sub-beam 119a will decrease with each out-coupling of a portion of sub-beam 119a at an exit pupil. This behavior can be extended to the other sub-beams. In some cases, it may be desirable to minimize variation in the intensities of the light coupled out of exit pupils 122 so that wherever the eye is in the eyebox, the eye sees a uniform display. In the same manner described for fold grating 116 and fold grating 120, out-coupler grating 112 may have different diffractive regions with different diffractive efficiencies to minimize variation in intensities of the light coupled out of exit pupils 122. In some cases, the intensity correction applied to the sub-beams at out-coupler grating 112 may be used alone or in combination with the intensity correction applied to the sub-beams at each of the fold gratings 116, 120.

In general, out-coupler grating 112 includes a first grating structure to diffract the first sub-beams from fold grating 116 to the exit pupils 122 and a second grating structure to diffract the second sub-beams from fold grating 120 to the exit pupils 122. Cross-coupling of light can occur at out-coupler grating 112 when sub-beams interact with the wrong grating structure, e.g., the second sub-beams interacting with the first grating structure or the first sub-beams interacting with the second grating structure. For example, if a portion of the second sub-beams interact with the first grating structure, the portion of the second sub-beams may be diffracted back towards fold grating 120. Similarly, if a portion of the first sub-beams interact with the second grating structure, the portion of the first sub-beams may be diffracted back towards fold grating 116. Residual cross-coupling at out-coupler grating 112 can be minimized by designing the first and second grating structures to have minimal diffraction efficiency for the angles that correspond to the cross-coupling directions.

In one implementation, in-coupler grating 108 may be a two-dimensional surface relief grating (SRG), hereafter referred to as 2D grating, having a first grating periodicity in a first direction and a second grating periodicity in a second direction. The first grating periodicity is tuned to diffract first light portion 114a at an angle that allows first light portion 114a to be coupled into first propagation path 124 within optical substrate 104. The second grating periodicity is tuned to diffract second light portion 114b at an angle that allows second light portion 114b to be coupled into second propagation path 128 within optical substrate 104. The grating elements that define the first and second grating periodicities are formed in a single layer on a substrate.

Figure 6A:
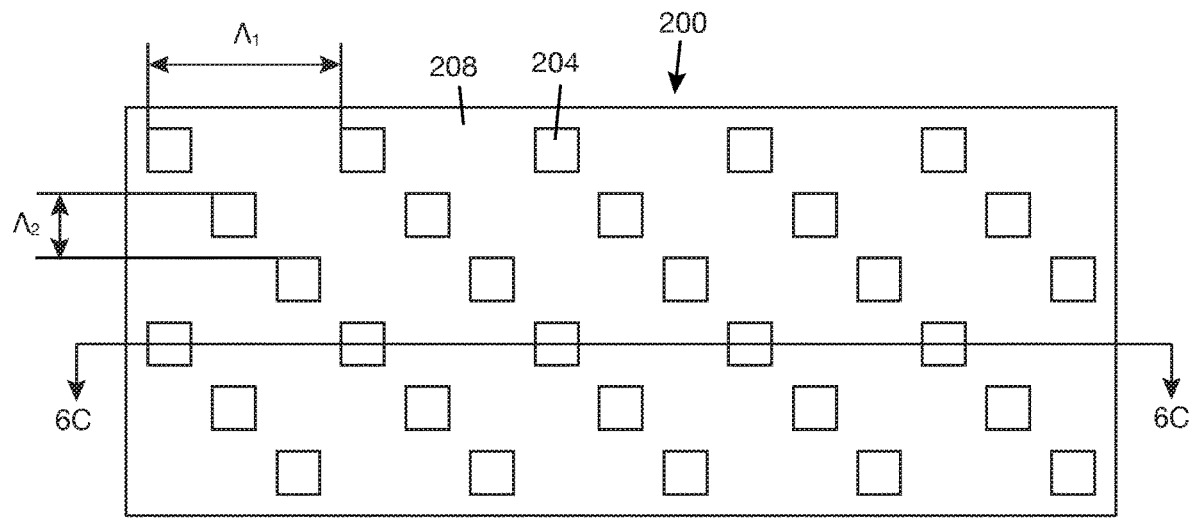
FIG. 6A is a top view of a 2D grating with staggered grating elements.
Figure 6B:
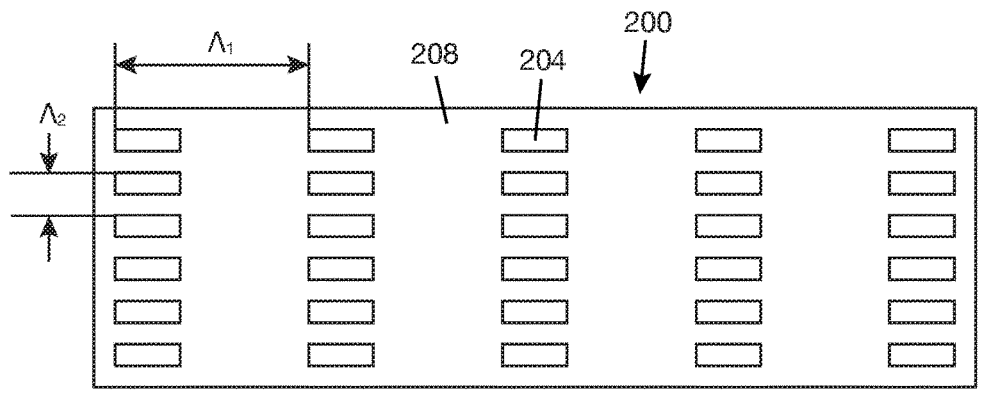
FIG. 6B is a top view of a 2D grating with aligned grating elements.
Figure 6C:
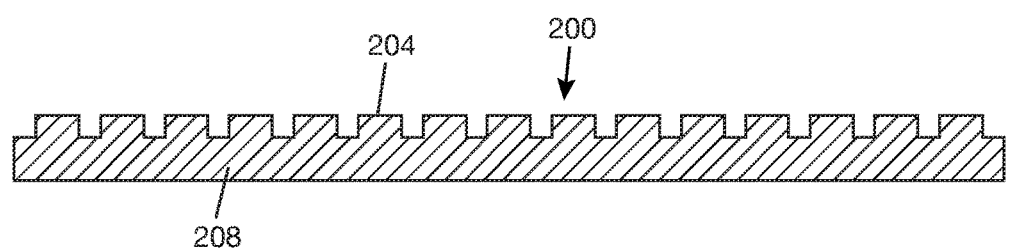
FIG. 6C is a cross-sectional view of the 2D grating of FIG. 6A along line 6C-6C.
Figure 6D:
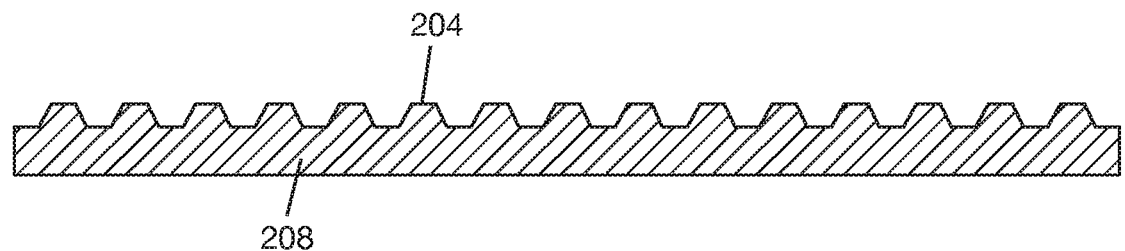
FIG. 6D is a variant of the cross-sectional view of FIG. 6C showing grating elements with slanted sides.

For illustrative purposes, FIG. 6A shows a generalized 2D grating 200 with grating elements 204 on a substrate 208. Grating elements 204 are arranged to define a first grating periodicity $\Lambda_1$ in a first direction and a second grating periodicity $\Lambda_2$ in a second direction. The first and second directions are orthogonal in FIG. 6A. However, a 2D grating may be designed where the first and second directions are non-orthogonal. FIG. 6A shows a staggered arrangement of grating elements 204. However, a 2D grating may be designed where the grating elements 204 are not staggered, as shown in FIG. 6B. FIGS. 6A and 6B show grating elements 204 as having square or rectangular cross-sectional shapes. However, grating elements 204 are not limited to these shapes. Grating elements 204 could have circular or triangular cross-sectional shapes, for example. FIG. 6C shows grating elements 204 as having straight sides. However, grating elements 204 are not limited to having straight sides. Grating elements 204 could have slanted sides, e.g., as shown in FIG. 6D, or curved sides, or a combination of different sides. Grating elements 204 could have the same height or could have different heights. The spacing between the grating elements, the shapes of the grating elements, the refractive index of the substrate on which the grating elements are formed, and the directions of the grating periodicities are all design elements that can be controlled to achieve a 2D grating suitable for use as in-coupler grating 108. In one example, 2D grating 200 is designed to couple light into optical substrate 104 according to Example 1 in Table 1. In another example, 2D grating 200 is designed to couple light into optical substrate 104 according to Example 2 in Table 1. 2D grating 200 (as in-coupler grating 108) may be arranged on or proximate any of major surfaces 105a, 105b (in FIG. 1B) of optical substrate 104 (in FIG. 1B). 2D grating 200 may be designed as a transmission grating, which means that the grating transmits light and applies designed optical function(s) to the light during the transmission, or as a reflection grating, which means that the grating reflects light and applies designed optical function(s) to the light during reflection.

Figure 7A:
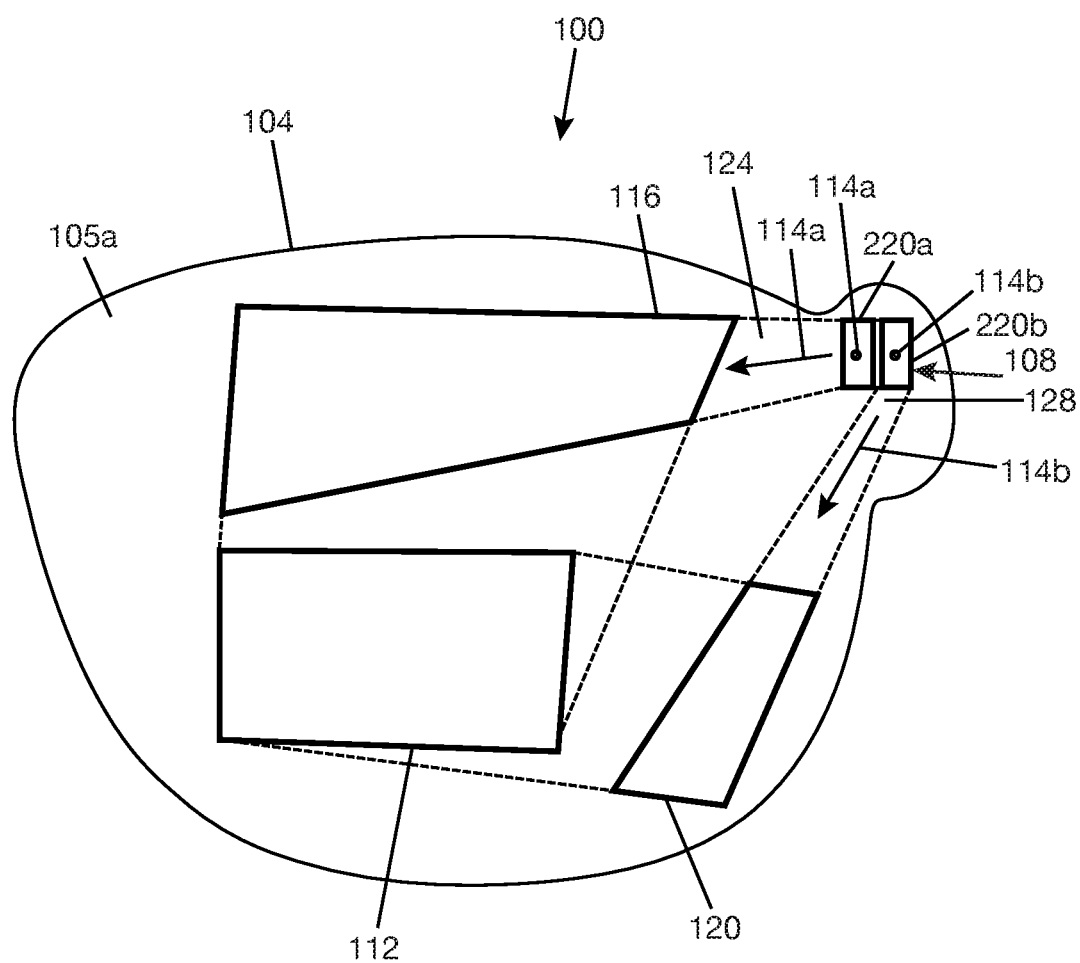
FIG. 7A is a front view of an optical combiner with an in-coupler grating using two 1D gratings arranged side by side.

In another implementation, in-coupler grating 108 may include two 1D gratings. The 1D gratings may be SRGs in one example. Referring to FIG. 7A, in-coupler grating 108 may include a first 1D grating 220a having a grating periodicity tuned to diffract and couple the first light portion 114a into the first propagation path 124 and a second 1D grating 220b having a grating periodicity tuned to diffract and couple the second light portion 114a into the second propagation path 128. In FIG. 7A, both 1D gratings 220a, 220b are arranged side by side on major surface 105a of optical substrate 104—this assumes that the 1D gratings 220a, 220b are transmission gratings. Alternatively, 1D gratings 220a, 220b could be arranged side by side on major surface 105b if the gratings are reflection gratings. The side by side arrangement of the 1D gratings requires that the incident light with a FOV is split into first light portion 114a having the first part of the FOV and second light portion 114b having the second part of the FOV prior to reaching the 1D gratings. Thus, 1D grating 220a will receive the first light portion 114a and couple the first light portion into first propagation path 124, and 1D grating 220b will receive the second light portion 114b and couple the second light portion 114b into second propagation path 128.

Figure 7B:
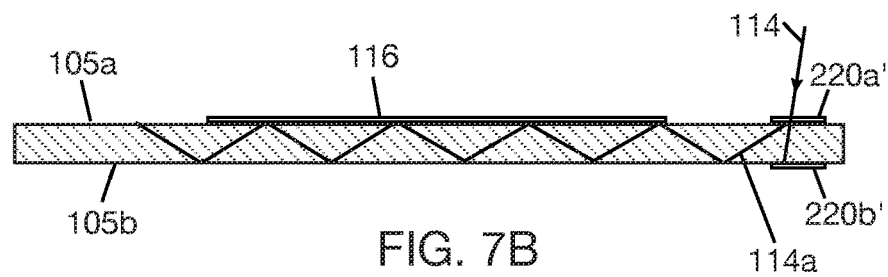
FIG. 7B is a cross-sectional view of an optical combiner with an in-coupler grating using two 1D gratings arranged on different major surfaces of an optical substrate.

Alternatively, as shown in FIG. 7B, one 1D grating, e.g., grating 220a', may be arranged on major surface 105a, and the other 1D grating, e.g., grating 220b', may be arranged on major surface 105b. Grating 220a' on major surface 105a may be a transmission grating, and the grating 220b' on major surface 105b may be a reflection grating. Grating 220a' will diffract and couple first light portion 114a into the optical substrate 104. Grating 220b' will diffract and couple second light portion 114b into the optical substrate 104. (Second light portion 114b is not visible in FIG. 7B because the view shown is along the first propagation path 124.) It is not necessary to split incident light 114 before reaching the gratings 220a', 220b' for this alternative implementation. Gratings 220a', 220b' may be SRGs in one example.

In another implementation, in-coupler grating 108 may be made with volume holograms recorded in one or more layers of holographic material. The holographic material may be, for example, a holographic film, a photopolymer, and/or a silver halide compound. Multiple layers of holographic material with recorded holograms may be stacked or otherwise spatially overlapped to form the in-coupler grating.

Figures 1, 8A:
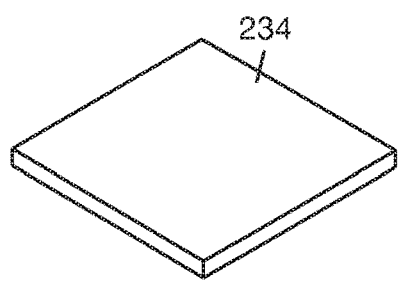
FIG. 8A-1 is a schematic diagram of a volume hologram that responds to light of a first color.
Figures 2, 8A:
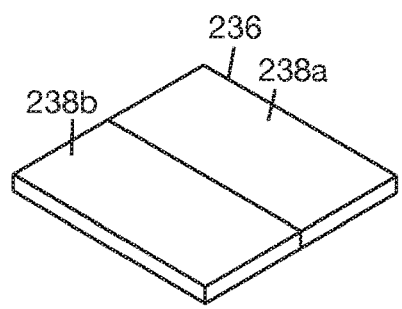
Figures 3, 8A:
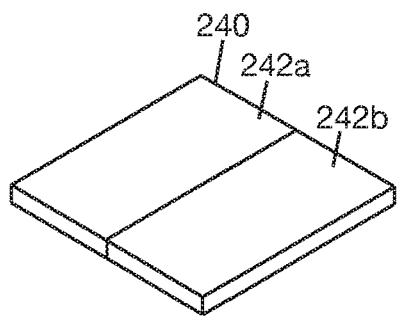
Figures 4, 8A:
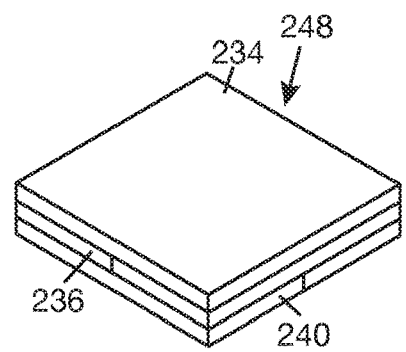
Figures 5, 8A:
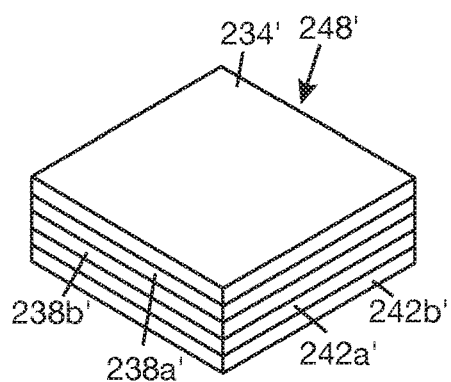

For illustrative purposes, FIG. 8A-1 shows a first color hologram 234, which is a volume hologram that diffracts light of first color C1 in a first direction D1. First color hologram 234 may be recorded in a single layer of holographic material. FIG. 8A-2 shows a spatial- and wavelength-multiplexed (SWM) holographic sub-grating 236 including a second color holographic region 238a and a third color holographic region 238b. Second color holographic region 238a and third color holographic region 238b may be recorded in a single layer of holographic material. Second color holographic region 238a and third color holographic region 238b may be contiguous or may be separated within the layer of holographic material. Second color holographic region 238a includes a volume hologram that diffracts light of second color C2 in the first direction D1 when the light of second color C2 has an incidence angle within a first range of incidence angles. Third color holographic region 238b includes a volume hologram that diffracts light of third color C3 in the first direction D1 when the light of third color C3 has an incidence angle within the first range of incidence angles. FIG. 8A-3 shows a SWM holographic sub-grating 240 including a second holographic region 242a and a third color holographic region 242b. Second color holographic region 242a and third color holographic region 242b may be formed in a single layer of holographic material. Second color holographic region 242a and third color holographic region 242b may be contiguous or may be separated within the layer of holographic material. Second color holographic region 242a includes a volume hologram that diffracts light of second color C2 in a second direction D2 when the light of second color C2 has an incidence angle within a second range of incidence angles. Third color holographic region 242b includes a volume hologram that diffracts light of third color C3 in the second direction D2 when the light of third color C3 has an incidence angle within the second range of incidence angles.

FIG. 8A-4 shows first color hologram 234 and SWM holographic gratings 236, 240 stacked, or otherwise spatially overlapped, to form an angle-, spatial-, and wavelength-multiplexed (ASWM) holographic grating 248. ASWM holographic grating 248 can be used as in-coupler grating 108 (in FIG. 1A) in Example 1 of Table 1. When holographic grating 248 is used as an in-coupler grating, the first direction D1 to which first color hologram 234 and SWM hologram 236 diffracts light will be towards first propagation path 124 (in FIG. 1A) and the second direction D2 to which SWM hologram 248 diffracts light will be towards the second propagation path 128 (in FIG. 1B). All the layers of the ASWM holographic grating 248 stack could be on or proximate the same major surface of optical substrate 104 (in FIG. 1B). Alternatively, some of the layers of the ASWM holographic grating 248 stack could be on or proximate one of the major surfaces 105a, 105b (in FIG. 1B) of the optical substrate, and the remaining layers of the stack could be on or proximate the other major surface of the optical substrate. For example, holographic gratings 234, 248 that diffract light to direction D1 could be on or proximate one of the major surfaces of the optical substrate, e.g., major surface 105a in FIG. 1B, and holographic grating 248 that diffracts light to direction D2 could be on or proximate the other major surface of the optical substrate, e.g., major surface 105b in FIG. 1B.

FIG. 8A-5 shows an alternative example of ASWM holographic grating 248' including first color volume hologram 234' recorded in a first layer of holographic material, a second color volume hologram 238a' recorded in a second layer of holographic material, a third color volume hologram 238b' recorded in a third layer of holographic material, a second color volume hologram 242a' recorded in a fourth layer of holographic material, and a third color volume hologram 242b' recorded in a fifth layer of holographic material. The holograms 234', 238a', 238b', 242a', and 242b' are arranged in a stack, or spatially overlapped. The order of the holograms in the stack is not restricted to what is shown in the figure. First color volume hologram 234' has the same properties as described for the first color volume hologram 234 (in FIG. 8A-1). Second color volume hologram 238a' has the same properties as described for the volume hologram in second color holographic region 238a (in FIG. 8A-2), and third color volume hologram 238b' has the same properties as described for the volume hologram in third color holographic region 238b (in FIG. 8A-2). Similarly, second color volume hologram 242a' has the same properties as described for the volume hologram in second color hologram region 242a (in FIG. 8A-3), and third color volume hologram 242b' has the same properties as described above for the volume hologram in third color hologram region 242b (in FIG. 8A-3). ASWM holographic grating 248' can be used as in-coupler grating 108 (in FIG. 1A) in Example 1 of Table 1 in the same manner described above for ASWM holographic grating 248. The ASWM holographic grating 248' stack could be arranged on the same side of the optical substrate. Alternatively, ASWM holographic grating 248' stack may be split by the optical substrate, as described above for ASWM holographic grating 248. For example, holographic gratings 234', 238a', 238b' may be on or proximate one of the major surfaces of the optical substrate, e.g., major surface 105a in FIG. 1B, and holographic gratings 242a', 242b' may be on or proximate the other major surface of the optical substrate, e.g., major surface 105b in FIG. 1B.

Figure 8B:
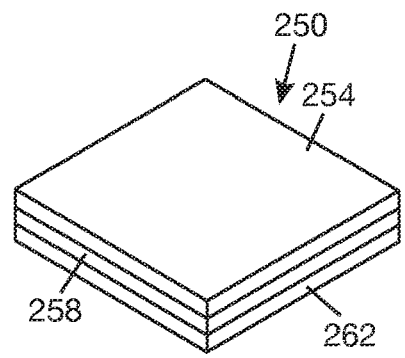
FIG. 8B is a schematic diagram of an alternative in-coupler grating formed with a stack of three holograms.

FIG. 8B shows another example holographic grating 250 including a first color volume hologram 254 that diffracts light of first color C1 in the first direction D1, a second color volume hologram 258 that diffracts light of second color C2 in the second direction D2, and third color volume hologram 262 that diffracts light of third color C3 in the second direction D2. Each of the holograms 254, 258, 262 may be formed in a single layer of holographic material. Holograms 254, 258, 262 are stacked, or otherwise spatially overlapped, to form a wavelength-multiplexed holographic grating. Holographic grating 250 may be used as an in-coupler grating 108 (in FIG. 1A) for Example 2 in Table 1. For example, first color volume hologram 254 may be a blue hologram, second color volume hologram 258 may be a red hologram, and third color volume hologram 262 may be a green hologram. When holographic grating 250 is used as an in-coupler grating, the first direction D1 to which first color volume hologram 254 diffracts light will be towards first propagation path 124 (in FIG. 1A), and the second direction to which second color hologram 258 and the third color hologram 262 diffracts light will be towards the second propagation path 128 (in FIG. 1A). The holographic grating 250 stack could be arranged on the same side of the optical substrate. Alternatively, holographic grating 230 stack may be split by the optical substrate so that some layers of the stack are on one side of the optical substrate and other layers of the stack are on the other side of the optical substrate. For example, hologram 254 could be on or proximate one of the major surfaces of the optical substrate, e.g., major surface 105a in FIG. 1B, and the holograms 258, 262 may be on or proximate the other major surface of the optical substrate, e.g., major surface 105b in FIG. 1B.

In-coupler grating 108 may also be designed with metasurfaces instead of SRGs or volume holograms. Metasurfaces are surfaces that are covered with sub-wavelength structures. The sub-wavelength structures can be designed to diffract first light portion 114a towards first propagation path 124 and a second light portion 114b towards second propagation path 128.

In one implementation, out-coupler grating 112 may be a 2D grating having a first grating periodicity in a first direction and a second grating periodicity in a second direction. The first grating periodicity is tuned to diffract first sub-beams (sub-beams from fold grating 116) at an angle that allows first sub-beams to be coupled out of exit pupils 122. The second grating periodicity is tuned to diffract second sub-beams (sub-beams from fold grating 120) at an angle that allows second sub-beams to be coupled out of exit pupils 122. The grating elements that define the first and second grating periodicities are formed in a single layer on a substrate. 2D grating for out-coupler grating 112 may be designed as described above with reference to 2D grating 200. If intensity correction is to be incorporated into out-coupler grating 112, the 2D grating may have different diffraction regions, each with different diffraction efficiencies to achieve a desired intensity uniformity across the exit pupils. 2D grating for out-coupler 112 may be arranged on or proximate any of major surfaces 105a, 105b of optical substrate 104. 2D grating for out-coupler grating 112 may be designed as a transmission grating or as a reflection grating. 2D grating may be formed with SRG or with metasurfaces.

Figure 9A:
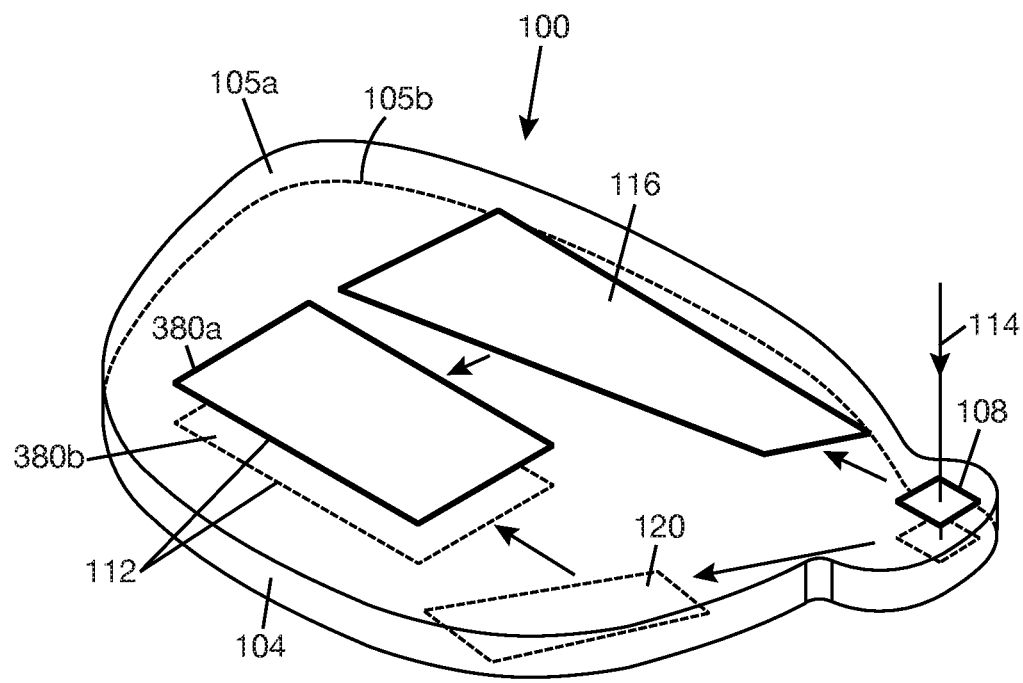
FIG. 9A is an isometric view of an optical combiner with two 1D gratings of an out-coupler grating arranged on different major surfaces of an optical substrate.
Figure 9B:
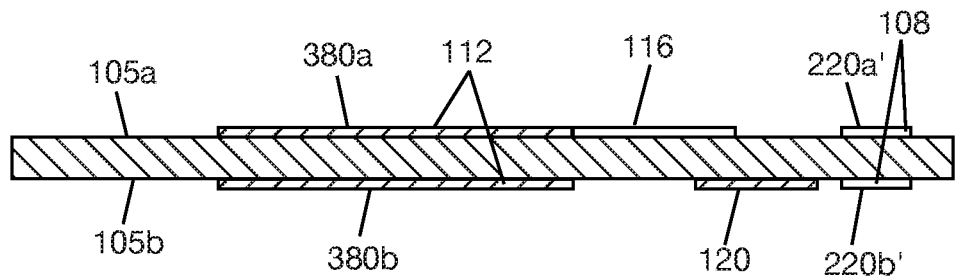
FIG. 9B is a cross-sectional view of the optical combiner of FIG. 9A.

In another implementation, out-coupler grating 112 may include two 1D gratings. Referring to FIGS. 9A and 9B, out-coupler grating 112 may include a first 1D grating 380a having a grating periodicity tuned to diffract first sub-beams to exit pupils 122 and a second 1D grating 380b having a grating periodicity tuned to diffract second sub-beams to exit pupils 122. Gratings 380a, 380b may be SRGs. Alternatively, gratings 380a, 380b may be made of metasurfaces. Grating 380a is shown on or proximate major surface 105a of optical substrate 104, and grating 380b is shown on or proximate major surface 105b (also, see FIG. 1B) of optical substrate 104. However, this could be reversed such that grating 380a is on or proximate major surface 105b and grating 380a is on or proximate major surface 105a. In the case where 1D gratings 380a, 380b are on or proximate separate major surfaces of optical substrate 108, one of the 1D gratings will be a transmission grating while the other is a reflection grating. For illustrative purposes, FIGS. 9A and 9B also show that fold gratings 116, 120 may be on or proximate different major surfaces of optical substrate 104. In some examples, out-coupler grating 112 based on two 1D gratings may be paired with in-coupler grating 108 based on two 1D gratings.

In another implementation, out-coupler grating 112 may be made with one or more volume holograms recorded in one or more layers of holographic material. The holographic material may be, for example, a holographic film, a photopolymer, and/or a silver halide compound. Multiple layers of holographic material with recorded holograms may be stacked or otherwise spatially overlapped to form the out-coupler grating.

Figure 10A:
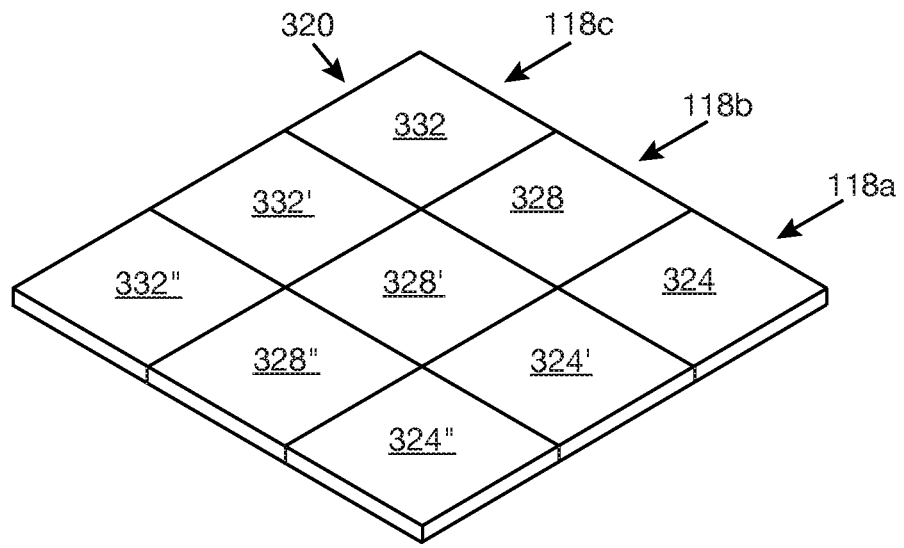
FIG. 10A is a schematic diagram of a holographic grating that responds to light of a first color, where the first holographic grating has holographic regions corresponding to different exit pupils.

In general, out-coupler grating 112 may include a first holographic grating to couple the first sub-beams to multiple exit pupils and a second holographic grating to couple the second sub-beams to multiple exit pupils. For illustrative purposes, FIG. 10A shows a first color spatially-multiplexed (SM) holographic sub-grating 320 including nine holographic regions to couple light to nine exit pupils. The number nine is arbitrary and is used for illustrative purposes only. Holographic regions 324, 324', 324" are positioned and oriented to receive first sub-beam 118a (from fold grating 116) and couple first sub-beam 118a to three different exit pupils. Thus, for example, portions of first sub-beam 118a will be coupled out of exit pupils corresponding to holographic regions 324, 324', 324" as first sub-beam 118a bounces on these holographic regions. Holographic regions 328, 328', 328" are positioned and oriented to receive first sub-beam 118b and couple first sub-beam 118b to three different exit pupils. Holographic regions 332, 332', 332" are positioned and oriented to receive first sub-beam 118c and couple first sub-beam 118c to three different exit pupils. First color SM holographic sub-grating 320 responds to light of a first color.

Figure 10B:
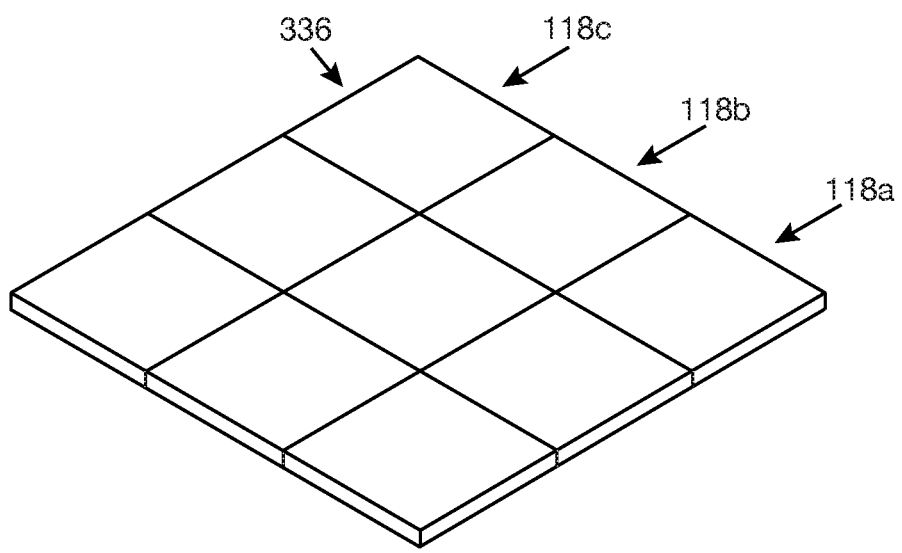
FIG. 10B is a schematic diagram of a holographic grating that responds to light of a second color, where the second color holographic grating has holographic regions corresponding to different exit pupils.

FIG. 10B shows a second color SM holographic sub-grating 336 having holographic regions positioned and oriented to receive first sub-beams 118a, 118b, 118c and couple the first sub-beams to multiple exit pupils. Second color SM holographic sub-grating 336 may be constructed in the same manner as described for first color SM hologram sub-grating 320, with the exception that second color SM holographic sub-grating 336 will respond to light of a second color.

Figure 10C:
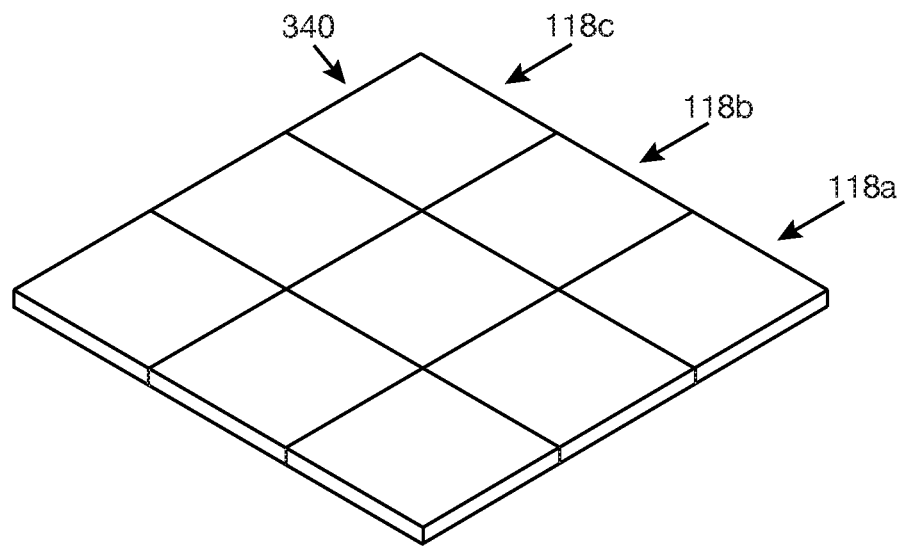
FIG. 10C is a schematic diagram of a holographic grating that responds to light of a third color, where the third color holographic grating has holographic regions corresponding to different exit pupils.

FIG. 10C shows a third color SM holographic sub-grating 340 having holographic regions positioned and oriented to receive first sub-beams 118a, 118b, 118c and couple the first sub-beams to multiple exit pupils. Third color SM holographic sub-grating 340 may be constructed in the same manner as described for first color SM hologram sub-grating 320, with the exception that third color SM holographic sub-grating will respond to light of a third color.

Each of first color SM holographic sub-grating 320, second color SM holographic sub-grating 336, and third color SM holographic sub-grating 340 may be formed in one or more layers of holographic material. The holographic regions can be made with different diffractive efficiencies to achieve a desired uniformity of light across the exit pupils.

Figure 10D:
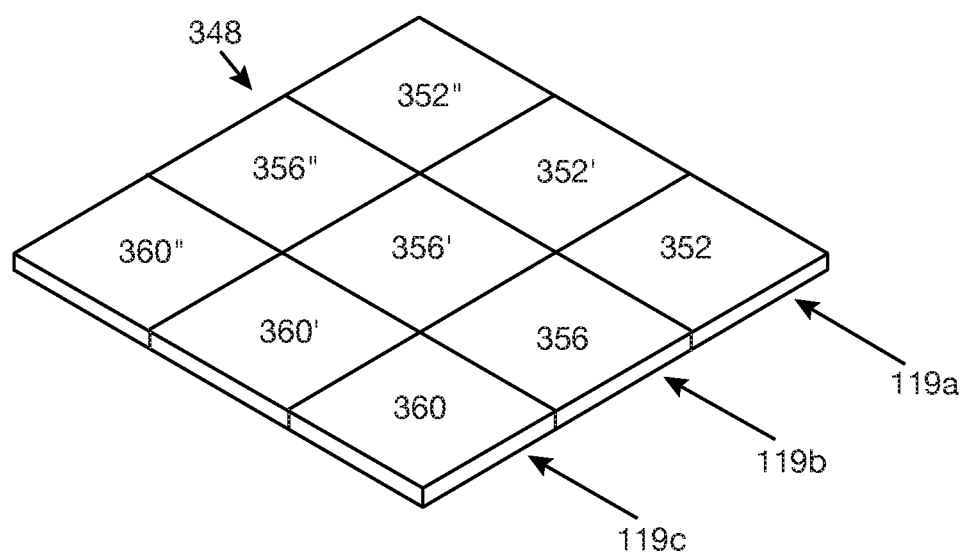
FIG. 10D is a schematic diagram of a holographic grating that responds to light of a second color, where the second color holographic grating has holographic regions corresponding to different exit pupils.

FIG. 10D shows a second color SM holographic sub-grating 348 including nine holographic regions to couple light to nine exit pupils. The number nine is arbitrary. Holographic regions 352, 352', 352" are positioned and oriented to receive second sub-beam 119a (from fold grating 120) and couple second sub-beam 119a to three different exit pupils. Thus, for example, portions of second sub-beam 119a will be coupled out of exit pupils corresponding to holographic regions 352, 352', 352" as second sub-beam 119a bounces on these holographic regions. Holographic regions 356, 356', 356" are positioned and oriented to receive second sub-beam 119b and couple second sub-beam 119b to three different exit pupils. Holographic regions 360, 360', 360" are positioned and oriented to receive second sub-beam 119c and couple second sub-beam 119c to three different exit pupils. Second color SM holographic sub-grating 348 responds to light of a first color.

Figure 10E:
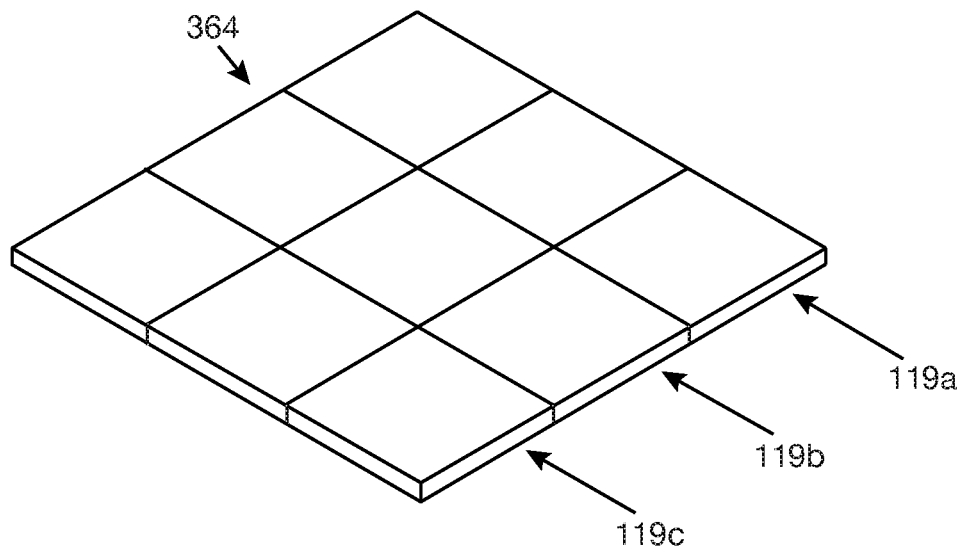
FIG. 10E is a schematic diagram of a holographic grating that responds to light of a third color, where the third color holographic grating has holographic regions corresponding to different exit pupils.

FIG. 10E shows a third color SM holographic sub-grating 364 having holographic regions positioned and oriented to receive second sub-beams 119a, 119b, 119c and couple the second sub-beams to multiple exit pupils. Third color SM holographic sub-grating 364 may be constructed in the same manner as described for second color SM holographic sub-grating 348, with the exception that third color SM holographic sub-grating 364 will respond to light of a third color. Each of second color SM holographic sub-grating 348 and third color SM holographic sub-grating 364 may be formed in one or more layers of holographic material. The holographic regions can be made with different diffractive efficiencies to achieve a desired uniformity of light across the exit pupils.

Figure 10F:
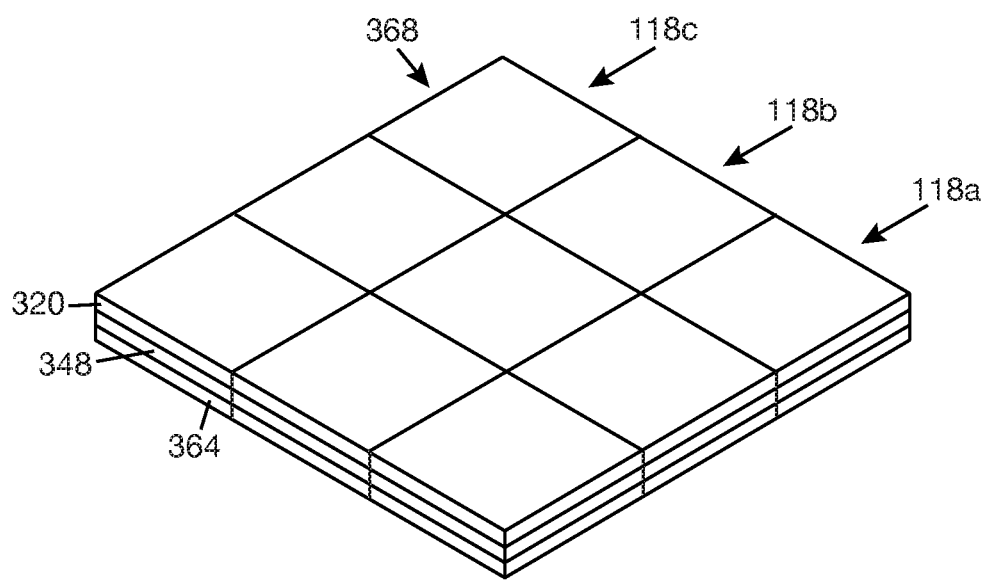
FIG. 10F is a schematic diagram of an out-coupler grating formed with the holographic gratings of FIGS. 10A, 10D, and 10E.

FIG. 10F shows that first color SM holographic sub-grating 320 that redirects first sub-beams, second color SM holographic sub-grating 348 that redirects second sub-beams, and third color SM holographic sub-grating 364 that redirects second sub-beams can be stacked, or spatially overlapped, to form a SWM holographic grating 368. SWM holographic grating 368 can be used as out-coupler grating 112 in Example 2 of Table 1. For example, first color SM holographic sub-grating 320 could respond to red light in the first sub-beams (i.e., the sub-beams received through the first propagation path 124 and fold grating 116), second color SM holographic sub-grating 348 could respond to green light in the second sub-beams (i.e., the sub-beams received through the second propagation path 128 and fold grating 120), and third color SM holographic sub-grating 364 could respond to blue light in the second sub-beams. The SWM holographic grating 368 stack may be arranged on the same side of the optical substrate 104 (in FIG. 1B). Alternatively, SWM holographic grating 368 stack may be split between the two sides of the optical substrate. For example, sub-grating 320 may be on or proximate one of the major surfaces of the optical substrate, e.g., major surface 105a (in FIG. 1B), and sub-gratings 348, 364 may be on or proximate the other of the major surfaces of the optical substrate, e.g., major surface 105b (in FIG. 1B).

Figure 10G:
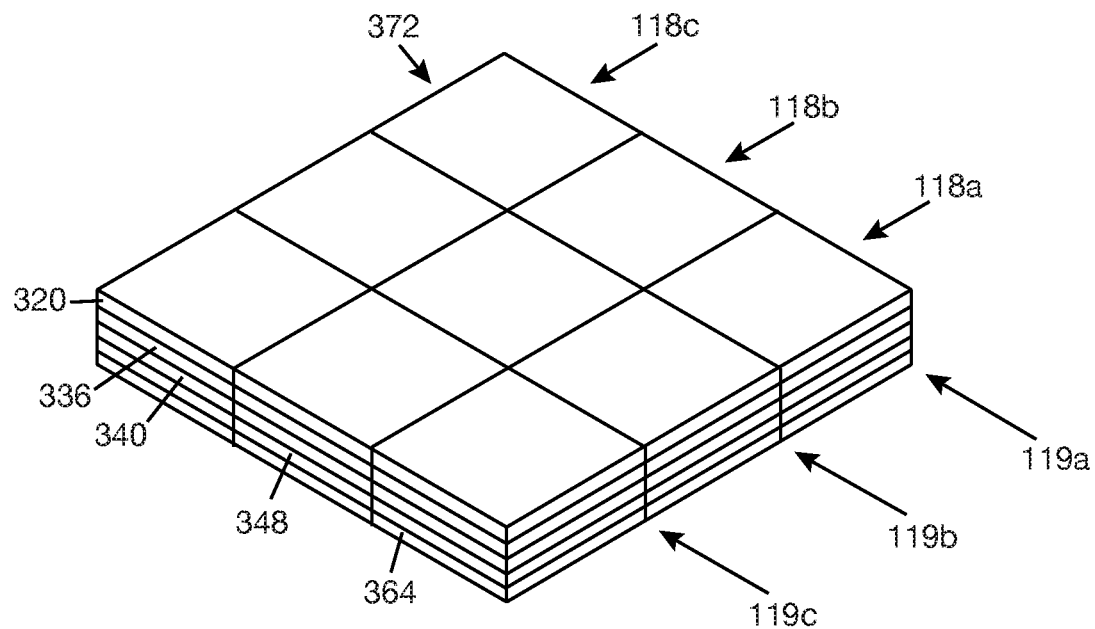
FIG. 10G is a schematic diagram of an out-coupler grating formed with the holographic gratings of FIGS. 10A-10E.

FIG. 10G shows that first color SM holographic sub-grating 320 that redirects first sub-beams, second color SM holographic sub-grating 336 that redirects first sub-beams, third color SM holographic sub-grating 340 that redirects first sub-beams, second color SM holographic sub-grating 348 that redirects second sub-beams, and third color SM holographic sub-grating 364 that redirects second sub-beams can be stacked, or spatially overlapped, to form a SWM holographic grating 372. SWM holographic grating 372 can be used as out-coupler grating 112 in Example 1 of Table 1. For example, first color SM holographic sub-grating 320 could respond to red light in the first sub-beams, second color SM holographic sub-grating 336 could respond to green light in the first sub-beams, third color SM holographic sub-grating 340 could respond to blue light in the first sub-beams, second color SM holographic sub-grating 348 could response to green light in the second sub-beams, and third color holographic grating 364 could respond to blue light in the second sub-beams. The SWM holographic grating 372 stack may be arranged on the same side of the optical substrate 104 (in FIG. 1B). Alternatively, SWM holographic grating 372 stack may be split between the two sides of the optical substrate. For example, sub-gratings 320, 336, 340 may be on or proximate one of the major surfaces of the optical substrate, e.g., major surface 105a (in FIG.) 1B, and sub-gratings 348, 364 may be on or proximate the other of the major surfaces of the optical substrate, e.g., major surface 105b (in FIG. 1B).

In-coupler grating 108, out-coupler grating 112, and fold gratings 116, 120 may be designed with SRGs, holograms, or metasurfaces. Typically, in-coupler grating 108, out-coupler grating 112, and fold gratings 116, 120 will be designed from the same type of diffraction gratings. That is, if in-coupler grating 108 is designed with SRGs, out-coupler grating 112 and fold gratings 116, 120 will also be designed with SRGs.

Figure 11A:
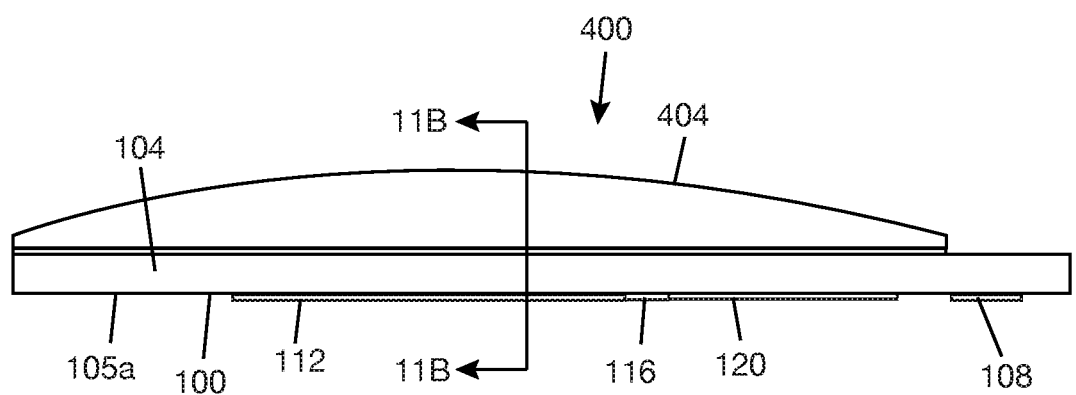
FIG. 11A is a side view of an optical combiner lens.
Figure 11B:
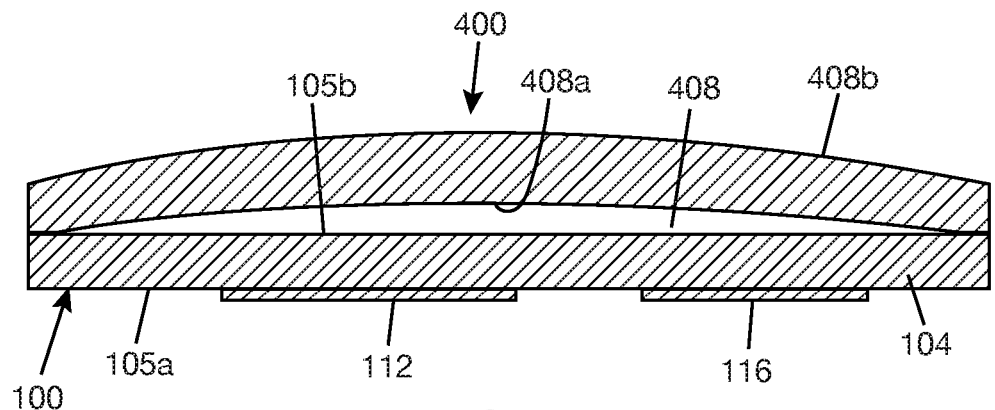
FIG. 11B is a cross-sectional view of the optical combiner lens of FIG. 11A along line 11B-11B.

FIG. 11A shows an optical combiner lens 400 including optical combiner 100 in stack with a lens 404. Optical substrate 104 of optical combiner 100 is physically coupled to lens 404. A medium gap 408, e.g., an air gap, may exist between opposing inner lens surface 408a of lens 408 and major surface 105b of optical substrate 104, as shown in FIG. 11B. The refractive index of the medium in medium gap 408 is generally lower than the refractive index of optical substrate 104 to enable light to propagate through optical substrate 104 by TIR. Lens 404 may be a meniscus lens, i.e., both inner and outer lens surfaces 408a, 408b are convex, as shown in FIG. 11B, or may be a planoconvex lens, i.e., inner lens surface 408a is planar while outer lens surface 408b is convex.

Figure 12A:
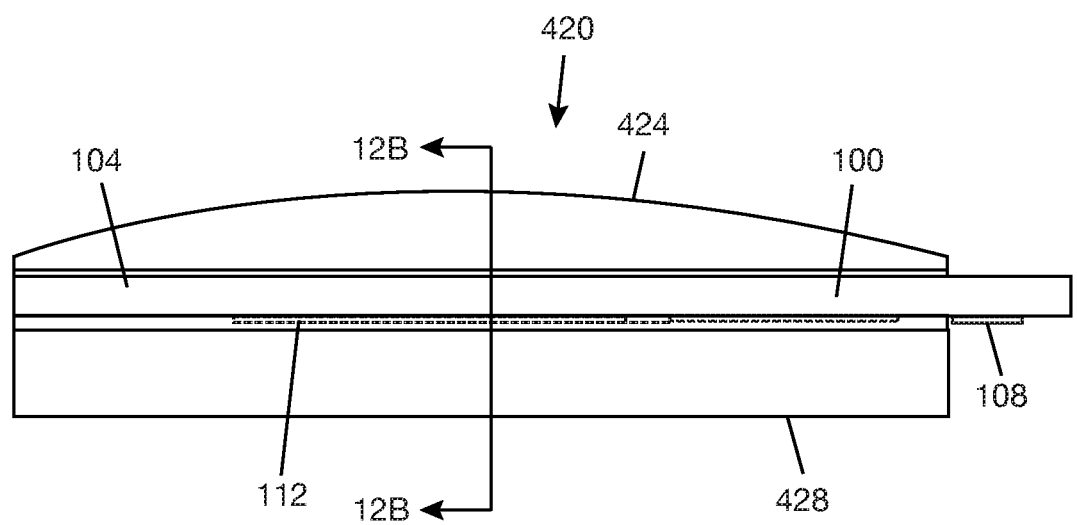
FIG. 12A is a side view of an optical combiner lens.
Figure 12B:
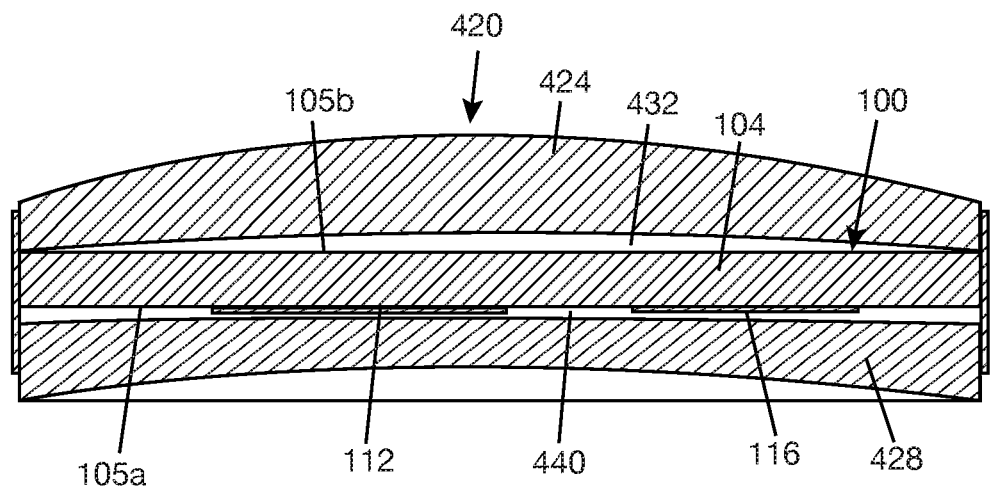
FIG. 12B is a cross-section of the optical combiner lens of FIG. 12A along line 12B-12B.

FIG. 12A shows an optical combiner lens 420 including optical combiner 100 in stack with a first lens 424 and a second lens 428. Optical substrate 104 of optical combiner 100 is disposed between first lens 424 and second lens 428 and physically coupled to both lenses 424, 428. A medium gap 432, e.g., an air gap, may exist between opposing surfaces of lens 424 and optical substrate 104, as shown in FIG. 12B. A medium gap 440, e.g., an air gap, may exist between opposing surfaces of lens 428 and optical substrate 104. Lens 424 may be a meniscus lens, as shown, or a planoconvex lens (with the planar surface of the lens facing major surface 105b of optical substrate 104). Lens 428 may be a biconcave lens, as shown, or a planoconcave lens (with the planar surface of the lens facing major surface 105a of optical substrate 104).

Figure 13:
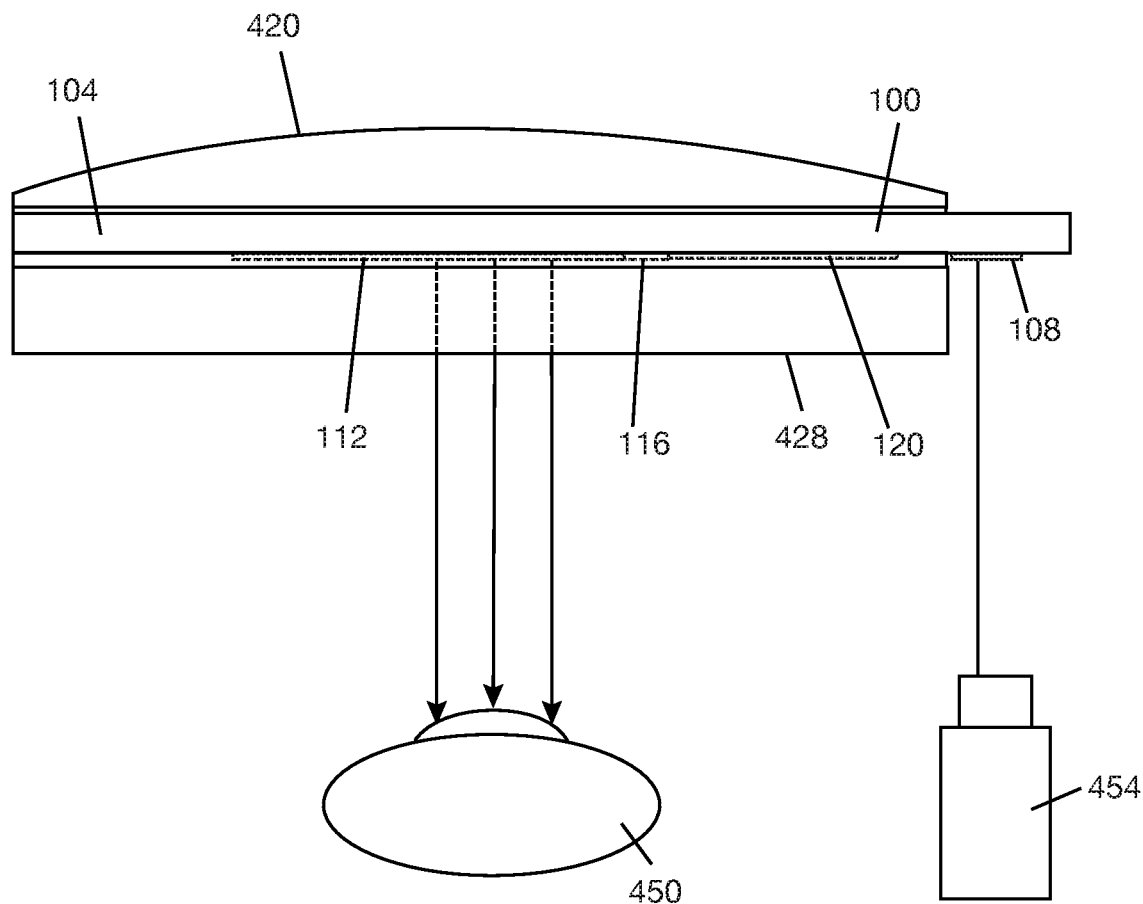
FIG. 13 is a schematic diagram illustrating light coupled into and out of an optical combiner lens that is in front of an eye.

FIG. 13 shows optical combiner lens 400 positioned in front of an eye 450, e.g., such positioning may involve a user wearing a heads-up display that includes the optical combiner lens. A display light source 454 generates light that is received by in-coupler grating 108. There may be optics (not shown) between display light source 454 and in-coupler grating 108 to focus the light into the in-coupler grating 108. In a wearable heads-up display (WHUD), the display light source 454 may be carried by a temple of the WHUD. The light generated by display light source 454 may be an image, or a portion of an image, to be displayed to eye 450. In-coupler grating 108 will couple a first light portion of the light from display light source 454 into a first propagation path within optical substrate 104 and a second light portion of the light from display light source 454 into a second propagation path within optical substrate 104. First light portion will propagate along first propagation path by TIR, and second light portion will propagate along second propagation path by TIR. First light portion will be expanded by fold grating 116 and redirected to out-coupler grating 112, and second light portion will be expanded by fold grating 120 and redirected to out-coupler grating 112, as previously explained. Out-coupler grating will couple the light received from fold gratings 116, 120 out of optical substrate 104 at multiple exit pupils. The light coupled out of optical substrate 104 will pass through lens 428, and at least a portion of the light will enter the pupil of eye 450.

The above description of illustrated embodiments, including what is described in the Abstract of the disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

The invention claimed is:

1. An optical combiner, comprising:
    an optical substrate having characteristics to guide light by total internal reflection;
    an in-coupler grating positioned to receive an incident light with a field of view (FOV), the in-coupler grating tuned to couple a first light portion of the incident light with a first part of the FOV (first light portion) into a first propagation path within the optical substrate and a second light portion of the incident light with a second part of the FOV (second light portion) into a second propagation path within the optical substrate, the first light portion including light of a first color, the second light portion excluding light of the first color;
    a first fold grating in optical communication with the first propagation path, the first fold grating tuned to expand the first light portion by splitting the first light portion into a plurality of first sub-beams and further tuned to change a beam propagation direction of the first sub-beams from the propagation direction of the first light portion;
    a second fold grating in optical communication with the second propagation path, the second fold grating tuned to expand the second light portion by splitting the second light portion into a plurality of second sub-beams and further tuned to change a beam propagation direction of the second sub-beams from the propagation direction of the second light portion; and
    an out-coupler grating positioned to receive the first sub-beams from the first fold grating and the second sub-beams from the second fold grating, the out-coupler grating having one or more diffraction gratings tuned to couple the first sub-beams and the second sub-beams out of the optical substrate at a plurality of exit pupils.

2. The optical combiner of claim 1, wherein the in-coupler grating is a two-dimensional surface relief grating having a first grating periodicity tuned to diffract and couple the first light portion into the first propagation path and a second grating periodicity tuned to diffract and couple the second light portion into the second propagation path.

3. The optical combiner of claim 1, wherein the in-coupler grating includes a first surface relief grating tuned to diffract and couple the first light portion into the first propagation path and a second surface relief grating tuned to diffract and couple the second light portion into the second propagation path.

4. The optical combiner of claim 3, wherein the optical substrate has a first major surface and a second major surface, the first major surface spaced apart from the second major surface along an axial thickness of the optical substrate, and wherein the first surface relief grating and the second surface relief grating are arranged side by side on or proximate one of the major surfaces.

5. The optical combiner of claim 3, wherein the optical substrate has a first major surface and a second major surface, the first major surface spaced apart from the second major surface by an axial thickness of the optical substrate, and wherein the first surface relief grating is arranged on or proximate the first major surface and the second surface relief grating is arranged on or proximate the second major surface.

6. The optical combiner of claim 1, wherein the incident light includes light of the first color, light of a second color, and light of a third color.

7. The optical combiner of claim 6, wherein the first light portion further includes a first portion of the light of the second color and a first portion of the light of the third color, and wherein the second light portion includes a second portion of the light of the second color and a second portion of the light of the third color.

8. The optical combiner of claim 6, wherein the second light portion includes the light of the second color and the light of the third color.

9. The optical combiner of claim 6, wherein the in-coupler grating comprises a first volume hologram that is responsive only to light of the first color, the first volume hologram to diffract and couple the light of the first color in a direction towards the first propagation path.

10. The optical combiner of claim 9, wherein the in-coupler grating further includes:
    a first set of multiplexed holograms comprising:
        a second volume hologram that is responsive only to the light of the second color over a first range of incidence angles, the second volume hologram to diffract and couple a first portion of the light of the second color in a direction towards the first propagation path; and
        a third volume hologram that is responsive only to the light of the third color over the first range of incidence angles, the third volume volume hologram to diffract and couple a first portion of the light of the third color in a direction towards the first propagation path; and
    a second set of multiplexed holograms comprising:
        a fourth volume hologram that is responsive only to the light of the second color over a second range of incidence angles, the fourth volume hologram to diffract and couple a second portion of the light of the second color in a direction towards the second propagation path; and
        a fifth volume hologram that is responsive only to the light of the third color over the second range of incidence angles, the fifth volume hologram to diffract and couple a second portion of the light of the third color in a direction towards the second propagation path.

11. The optical combiner of claim 10, wherein the in-coupler grating further includes:
    a second volume hologram that is responsive only to the light of the second color, the second volume hologram to diffract and couple the light of the second color in a direction towards the second propagation path; and a third volume hologram that is responsive only to the light of the third color, the third volume hologram to diffract and couple the light having the third color in a direction towards the second propagation path.

12. The optical combiner of claim 6, wherein the out-coupler grating comprises a first holographic grating positioned and oriented to receive the plurality of first sub-beams from the first fold grating and redirect the plurality of first sub-beams to a plurality of exit pupils and a second holographic grating positioned and oriented to receive the plurality of second sub-beams from the second fold grating and redirect the plurality of second sub-beams to the plurality of exit pupils.

13. The optical combiner of claim 12, wherein the first holographic grating comprises a plurality of first holographic regions corresponding to the plurality of exit pupils, wherein the second holographic grating comprises a plurality of second holographic regions corresponding to the plurality of exit pupils, and wherein each of the first holographic regions and second holographic regions is tuned to diffract light to the respective exit pupil.

14. The optical combiner of claim 13, wherein the first holographic grating includes a first holographic sub-grating that is responsive only to a portion of the first sub-beams having the first color, a second holographic sub-grating that is responsive only to a portion of the first sub-beams having the second color, and a third holographic sub-grating that is responsive only to a portion of the first sub-beams having the third color, and wherein each of the first holographic sub-grating, the second holographic sub-grating, and the third holographic sub-grating includes a plurality of holographic regions corresponding to the plurality of exit pupils, each of the holographic regions tuned to diffract light to the respective exit pupil.

15. The optical combiner of claim 14, wherein the second holographic grating includes a fourth holographic sub-grating that is responsive only to a portion of the second sub-beams having the second color and a fifth holographic sub-grating that is responsive only to a portion of the second sub-beams having the third color, and wherein each of the fourth holographic sub-grating and the fifth holographic sub-grating includes a plurality of holographic regions corresponding to the plurality of exit pupils, each of the holographic regions tuned to diffract light to the respective exit pupil.

16. The optical combiner of claim 15, wherein the first holographic grating includes a first holographic sub-grating that is responsive only to a portion of the first sub-beams having the first color, wherein the second holographic grating includes a second holographic sub-grating that is responsive only to a portion of the second sub-beams having the second color and a third holographic sub-grating that is responsive only to a portion of the second sub-beams having the third color, wherein each of the first holographic sub-grating, the second holographic sub-grating, and the third holographic sub-grating includes a plurality of holographic regions corresponding to the plurality of exit pupils, and wherein each of the holographic regions is tuned to diffract light to the respective exit pupil.

17. The optical combiner of claim 1, wherein the out-coupler grating includes a first surface relief grating tuned to diffract and couple the first sub-beams to a plurality of exit pupils and a second surface relief grating tuned to diffract and couple the second sub-beams to the plurality of exit pupils.

18. The optical combiner of claim 1, wherein each of the first and second fold gratings includes at least two different diffractive regions with different diffractive efficiencies tuned to minimize a variation in intensities of the respective sub-beams generated by the first and second fold gratings.

19. An optical combiner lens, comprising:
a lens;
an optical substrate in stack with the lens;
an in-coupler grating positioned to receive an incident light with a field of view (FOV), the in-coupler grating tuned to couple a first light portion of the incident light with a first part of the FOV (first light portion) into a first propagation path within the optical substrate and a second light portion of the incident light with a second part of the FOV (second light portion) into a second propagation path within the optical substrate, the first light portion including light of a first color, the second light portion excluding light of the first color;
a first fold grating in optical communication with the first propagation path, the first fold grating tuned to expand the first light portion by splitting the first light portion into a plurality of first sub-beams and further tuned to change a beam propagation direction of the first sub-beams from the propagation direction of the first light portion;
a second fold grating in optical communication with the second propagation path, the second fold grating tuned to expand the second light portion by splitting the second light portion into a plurality of second sub-beams and further tuned to change a beam propagation direction of the second sub-beams from the propagation direction of the second light portion; and
an out-coupler grating positioned to receive the first sub-beams from the first fold grating and the second sub-beams from the second fold grating, the out-coupler grating having one or more diffraction gratings tuned to couple the first sub-beams and the second sub-beams out of the optical substrate at a plurality of exit pupils.

20. An optical combiner lens, comprising:
a first lens;
a second lens;
an optical substrate in stack with and in between the first lens and the second lens;
an in-coupler grating positioned to receive an incident light with a field of view (FOV), the in-coupler grating tuned to couple a first light portion of the incident light with a first part of the FOV (first light portion) into a first propagation path within the optical substrate and a second light portion of the incident light with a second part of the FOV (second light portion) into a second propagation path within the optical substrate, the first light portion including light of a first color, the second light portion excluding light of the first color;
a first fold grating in optical communication with the first propagation path, the first fold grating tuned to expand the first light portion by splitting the first light portion into a plurality of first sub-beams and further tuned to change a beam propagation direction of the first sub-beams from the propagation direction of the first light portion;
a second fold grating in optical communication with the second propagation path, the second fold grating tuned to expand the second light portion by splitting the second light portion into a plurality of second sub-beams and further tuned to change a beam propagation direction of the second sub-beams from the propagation direction of the second light portion; and an out-coupler grating positioned to receive the first sub-beams from the first fold grating and the second sub-beams from the second fold grating, the out-coupler grating having one or more diffraction gratings tuned to couple the first sub-beams and the second sub-beams out of the optical substrate at a plurality of exit pupils.

\* \* \* \* \*

UNITED STATES PATENT AND TRADEMARK OFFICE
CERTIFICATE OF CORRECTION

| | | |
|---|---|---|
| PATENT NO. | : 11,307,429 B2 | |
| APPLICATION NO. | : 16/738100 | |
| DATED | : April 19, 2022 | |
| INVENTOR(S) | : Shreyas Potnis and Timothy Paul Bodiya | |

It is certified that error appears in the above-identified patent and that said Letters Patent is hereby corrected as shown below:

In the Claims

At Column 18 Line 45, please Delete "volume" after volume and before hologram

Signed and Sealed this
Seventh Day of March, 2023

Katherine Kelly Vidal
*Director of the United States Patent and Trademark Office*